US006959572B2

United States Patent
Lawrence et al.

(10) Patent No.: US 6,959,572 B2
(45) Date of Patent: Nov. 1, 2005

(54) FIXTURE FOR HOLDING METALS PARTS FOR BENDING OR TWIST CORRECTION

(75) Inventors: Phillip G. Lawrence, West Olive, MI (US); Frederick W. Hohman, Spring Lake, MI (US); Jeffrey R. Braak, Grand Haven, MI (US)

(73) Assignee: ProEnterpriz, Inc., Grand Haven, MI (US)

( * ) Notice: Subject to any disclaimer, the term of this patent is extended or adjusted under 35 U.S.C. 154(b) by 227 days.

(21) Appl. No.: 10/324,901

(22) Filed: Dec. 20, 2002

(65) Prior Publication Data

US 2004/0118175 A1 Jun. 24, 2004

(51) Int. Cl.[7] .............................................. B21C 51/00
(52) U.S. Cl. ......................... 72/31.03; 72/296; 72/299; 72/389.1; 72/421
(58) Field of Search ............................ 72/31.03, 31.04, 72/31.1, 296, 297, 298, 299, 371, 389.1, 421; 29/889.7, 889.72

(56) References Cited

U.S. PATENT DOCUMENTS

| | | | | | |
|---|---|---|---|---|---|
| 3,280,607 | A | * | 10/1966 | Esken et al. ................. | 72/14.9 |
| 3,280,612 | A | * | 10/1966 | Schmidt ...................... | 72/298 |
| 3,769,836 | A | * | 11/1973 | Heldenbrand ................ | 72/302 |
| 4,203,308 | A | * | 5/1980 | Davis ......................... | 72/31.03 |
| 5,676,013 | A | * | 10/1997 | Kahlau ........................ | 72/299 |
| 5,771,726 | A | * | 6/1998 | Bibby et al. ................. | 72/20.2 |
| 6,109,089 | A | * | 8/2000 | Farney et al. ................ | 72/422 |

OTHER PUBLICATIONS

Publication entitled "No More Rope," by Phil Lawrence, ProEnterpriz, reprinted from Springs, Summer 2000 vol. 39, No. 3.

Publication entitled "Advantages of Caged Ball™ Technology" by THK Co., Ltd., Tokyo Japan, Catalog No. 248–1E., ©THK Co., Ltd. 2000. 03.

Publication entitled "rino Couplings, Multi–Beam—Multi–Helix Flexible Beam Couplings, Backlash Free—6 Beam Clamp Fixing" by Rino Mechanical Components Inc.; published as least as of Dec. 20, 2001.

Publication entitled "Incremental Rotary Encoders, ROD 500 Series" by Heidenhain Corporation, Catalog, USA Aug. 1994.

Publication entitled "Smart MultiTrac Ball Bushing Linear Bearings—Closed Bearings" by Thomson Industries, Inc., MSC Industrial Supply Co. Catalog, Copyright 2002.

Publication entitled "SIKO Electronic Displays, MA47" by SIKO GmbH, Catalog Siko, Jun. 6, 1999, Art. Nr. 75959.

Publication entitled "L–GAGE™ Laser Sensor Specifications & Dimensions" by Banner Engineering Corporation, Copyright, 1999 Banner Engineering Corporation.

Declaration of Phillip G. Lawrence (6 pages), dated Feb. 24, 2003, including attached Exhibits A–F.

* cited by examiner

*Primary Examiner*—Ed Tolan
(74) *Attorney, Agent, or Firm*—Van Dyke, Gardner, Linn & Burkhart, LLP

(57) ABSTRACT

A fixture for supporting a workpiece such as a cast turbine blade allows bending and/or twist correction of the workpiece with the movable ram of a press. The fixture includes a base and a pair of workpiece supports mounted at spaced locations on the base. A bearing such as a spherical swivel bearing is included in each workpiece support. Each bearing has a mount receiving a portion of the workpiece therein. When the workpiece is supported by the bearing mounts along a support axis, and is engaged by the press ram intermediate the workpiece supports for bending correction, the bearings and workpiece can move in at least one plane including the support axis. Preferably, the bearings also allow rotational movement about the support axis, while a rotation imparting member allows twist correction by rotational movement of one bearing and the workpiece portion therein with respect to the other bearing which is restricted from rotating.

30 Claims, 12 Drawing Sheets

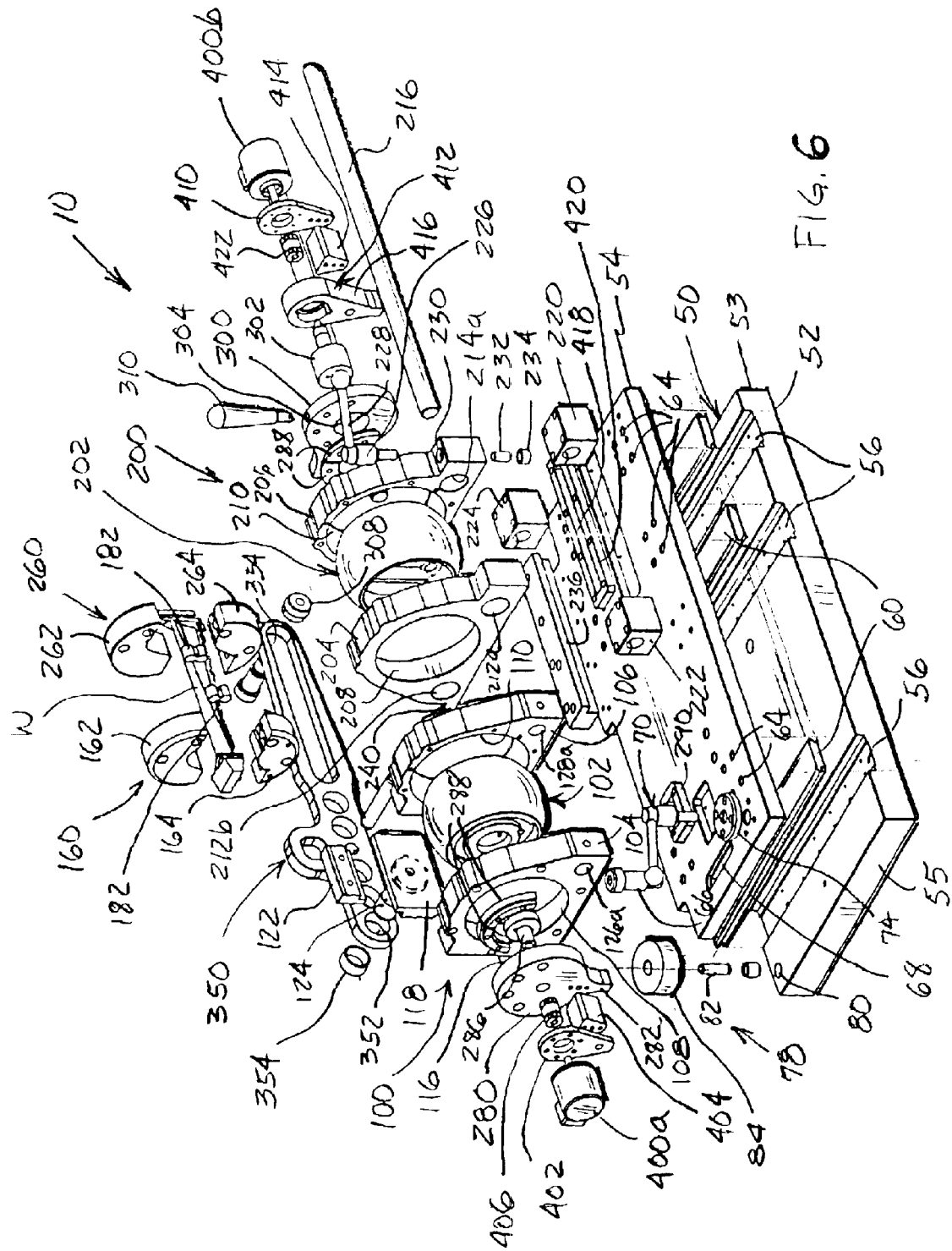

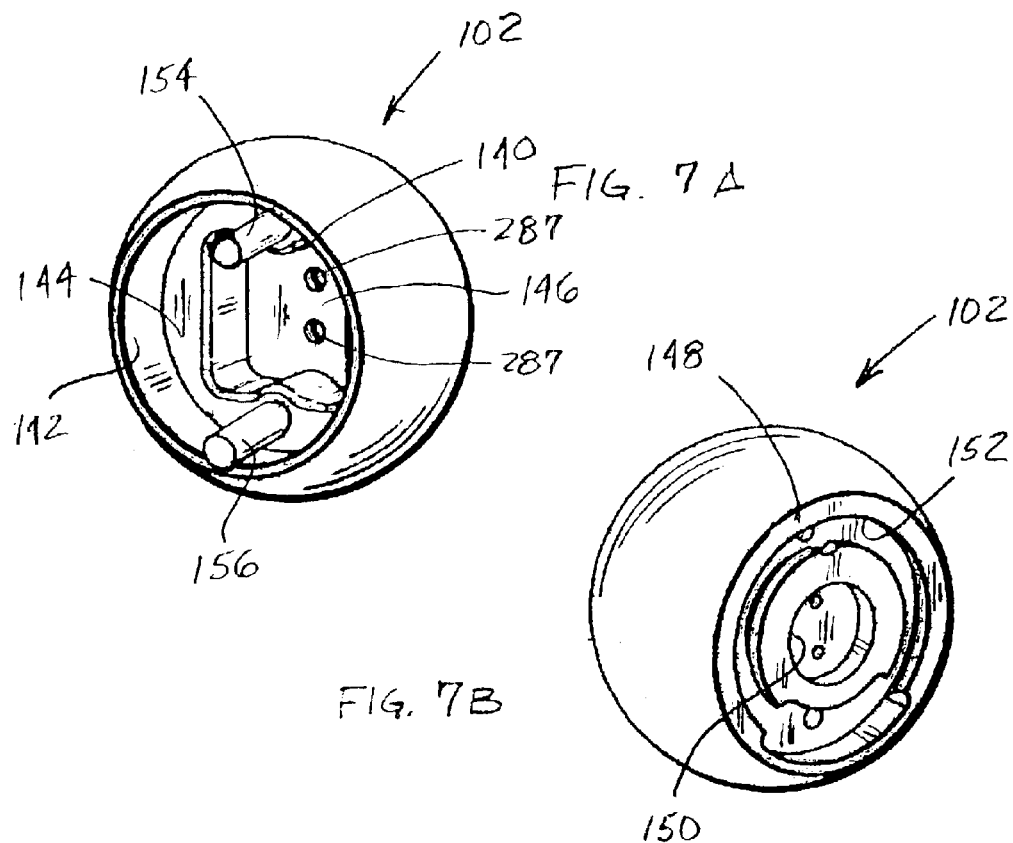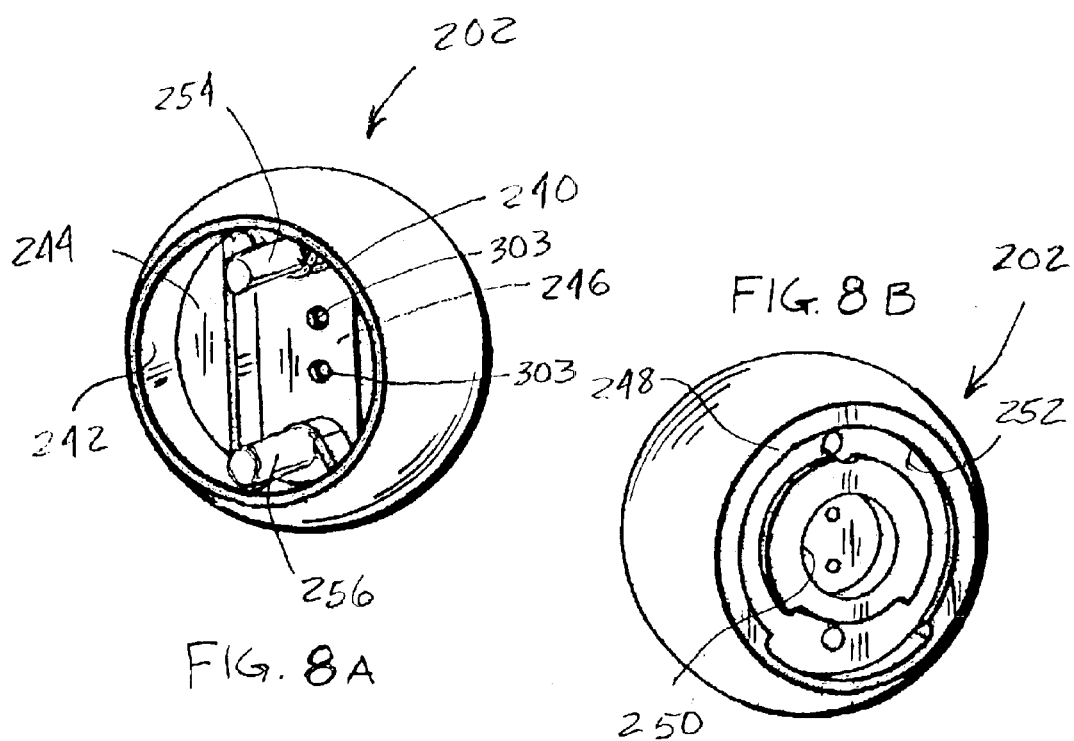

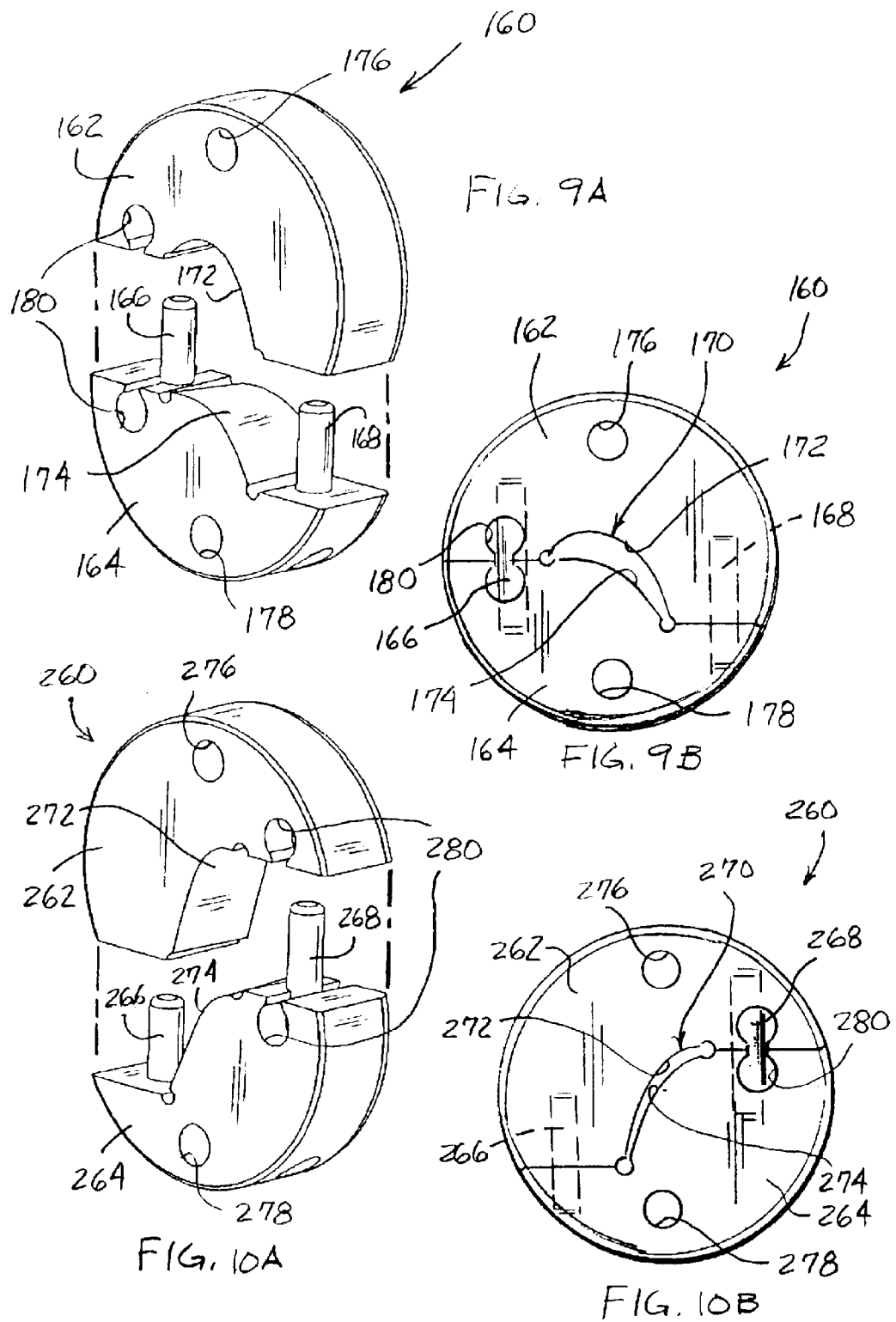

FIXTURE FOR HOLDING METALS PARTS FOR BENDING OR TWIST CORRECTION

FIELD OF THE INVENTION

The present invention relates to apparatus for holding workpieces, and especially metallic workpieces, during mechanical correction of out-of-tolerance dimensions by bending, twisting and/or both bending and twisting following initial casting or other forming processes such as heat treating. More particularly, the invention relates to a fixture for supporting a workpiece on a press for straightening/bending or twist correction or both of the workpiece in a precisely controlled manner.

BACKGROUND OF THE INVENTION

In the manufacture of metal products and parts, a common production method is to cast such products or parts from molten metal. A particular form of casting is the manufacture of investment castings such as turbine blades for gas turbine generators, jet engines, or the like. Such casting processes create raw castings which are often out of tolerance from required specifications, i.e., castings that fail to meet necessary dimensional ranges for such products. Dimensional variations in various metal products and parts can also be experienced after such parts are heat treated for durability purposes. Dimensional corrections must be made before the parts can be used or the parts are discarded. Accordingly, it has been common practice in the metal casting industry, as well as for other treated metal products, to correct such out of tolerance products or parts prior to sending such products or parts on for final machining.

In the past, the correction of dimensional variations in out of tolerance metal products and parts has primarily been accomplished through manual straightening or bending practices. Such methods are inaccurate and unreliable at best, and failed to provide any precise, controlled method which would correct such parts on a consistent basis.

A common manual correction method included manually pressing the part to be corrected or engaging the part by hand with a hammer on an anvil. This accomplished a rough, crude type of bending correction. If twist correction was necessary around a defined axis within the part, it was usually made by clamping the part in a vice and manually twisting a free end of the part with a T-bar or similar tool. In each case, these methods were very time consuming, typically inaccurate, and most often produced poor correction results. Especially when manual methods using a hammer were utilized, it was very difficult to produce small, minor corrections because manual hammer strikes typically produce significant impact and/or could not be properly controlled. Therefore, the manual correction of a wide variety of manufactured metal parts, produced by casting or otherwise, such as gundrills, slides for vehicle sun roofs, springs for vehicle transmission shafts, medical implants, drill bits and/or saw blades often encountered high rejection rates due to the inability to make proper corrections in the rough parts resulting from initial manufacturing processes. Consequently, significant expense was added to the production of a desired number of parts or products.

In addition, in those metallic parts manufactured by investment casting such as turbine blades, where both bending correction and twist correction around a longitudinal axis is critical, it has been experienced that correction of the longitudinal bow or straightening of the part can itself induce a certain amount of twist in the part during such correction. Correspondingly, correcting the twist in a manufactured metal part can often induce the need for bow correction or straightening.

Accordingly, a need was encountered in the metal and cast metal parts manufacturing industry for a device enabling an initially manufactured or treated part to be held precisely during bow correction or straightening, twist correction and/or bow and twist correction with a press in a controlled manner for reliable, accurate and precise correction of the part.

SUMMARY OF THE INVENTION

The present invention provides an apparatus for holding and supporting a workpiece on a press of the type having a workpiece support area and a movable press ram. The apparatus allows the workpiece to be engaged by the press for bending or bow correction, twist correction or both bending/bow correction and twist correction of the workpiece in a controlled and precise manner.

In one form, the apparatus of the invention is a fixture for supporting a workpiece on a press for bending and/or twist correction of the workpiece, the press being of the type having a workpiece support area and a movable ram. The fixture comprises a base for support on the press workpiece support area, and a pair of workpiece supports. The workpiece supports are mounted at spaced locations on the base, and each includes a bearing having a workpiece mount for receiving a workpiece therein. The workpiece is supported along a support axis for engagement by the press ram intermediate the workpiece supports for bending correction when mounted in the workpiece mounts in the bearings. The bearings each allow movement in at least one plane including the support axis when the workpiece is engaged by the press ram, as well as rotationally around the support axis. At least one of the workpiece supports includes a rotation restricting member connected to the bearing in the one workpiece support to restrict rotational movement of the one bearing and a first workpiece portion supported therein around the support axis while allowing movement of the one bearing and at least the first workpiece portion in the plane of the support axis. The other of the workpiece supports includes a rotation imparting member connected to the other of the bearings and adapted for movement by the press ram. The rotation imparting member imparts rotational movement to the other bearing and a second workpiece portion supported therein around the support axis when moved by the press ram such that the rotational position of the second workpiece portion is changed with respect to the rotational position of the first workpiece portion for twist correction of the workpiece.

In another form of the invention, the invention is a fixture for supporting a workpiece on a press for twist correction of the workpiece. In this form, a base is adapted for support on the press workpiece support area and includes a pair of workpiece supports. The workpiece supports are mounted at spaced locations on the base, and each includes a bearing having a workpiece mount for receiving a workpiece therein. The workpiece is supported along a support axis when mounted in the workpiece mounts in the bearings of the spaced workpiece supports. The bearings each allow at least rotational movement around the support axis. In addition, at least one of the workpiece supports includes a rotation restricting member connected to the one bearing in the one workpiece support to restrict rotational movement of the one bearing and a first workpiece portion supported therein around the support axis. The other of the workpiece supports includes a rotation imparting member connecting to the other of the bearings and adapted for movement by the press ram. The rotation imparting member imparts rotational movement to the other bearing and a second workpiece portion supported therein rotationally around the support axis when moved by the press ram such that the rotational position of the second workpiece portion is changed with respect to the rotational portion of the first workpiece portion for twist correction of the workpiece.

In yet another form, the invention is a fixture for supporting a workpiece on a press for bending correction of the workpiece. In this form, a base is adapted for support on the press workpiece support area and includes a pair of workpiece supports. The workpiece supports are mounted at spaced locations on the base, and each includes a bearing having a mount for receiving a workpiece therein. The workpiece is supported along a support axis for engagement by the press ram intermediate the workpiece supports for bending correction when mounted in the workpiece mounts in the bearings. The bearings each allow movement in at least one plane including the support axis when the workpiece is engaged by the press ram.

In more specific aspects of the invention, each of the bearings in the workpiece supports may be a swivel bearing such as a spherical bearing. Further, at least one of the workpiece supports is movable toward and away from the other such that the distance between the bearings and workpiece mounts may be changed to accommodate different workpieces and to allow loading and unloading of workpieces.

In another aspect, the base includes a bearing plate slidably mounted on a support plate, the workpiece supports being mounted on the bearing plate. The bearing plate may be secured by at least one clamp, while a fixture is included having a stop for limiting sliding movement of the bearing plate on the support plate. The stop comprises a removable abutment having two positions, one position allowing greater sliding movement of the bearing plate toward the abutment than the other position.

Each of the bearings may include a recess for receiving the workpiece mount, while each of the workpiece mounts may comprise a collet having an aperture therethrough matching the contour of the outer surface of the workpiece portion received therein. The collet is removably mounted in the swivel bearing recess. Preferably, each of the collets includes a plurality of sections which are separable for mounting the workpiece portion in the aperture prior to mounting the collet in the bearing recess. Further, the bearing may include a second recess for receiving a portion of the workpiece when the collet is received in its recess.

In yet other aspects, the fixture includes an arm mounted thereon and engaging the rotation imparting member, the arm converting reciprocal movement of the press ram to rotational movement of the rotation imparting member along with the other bearing and the workpiece mounted therein. Preferably, the arm is pivotally mounted on the fixture, engages the rotation imparting member, and is adapted to be pivoted by the movement of the press ram to change the rotational position of the rotation imparting member. Specifically, the arm may be mounted on a pivot and includes an elongated opening, the rotation imparting member comprising a twist plate having a projection including a roller received in the elongated opening. The twist plate projection extends radially with respect to the support axis of the workpiece, while the pivot preferably extends perpendicular to the support axis.

Further, the rotation restricting member may include a projection connected to at least one of the swivel bearings and a receptacle having walls extending parallel to the workpiece support axis. The projection extends into the receptacle such that the receptacle walls limit movement of the projection to a direction parallel to the support axis.

In addition, a measuring device, such as a digital encoder, may be connected to at least one of the bearings to measure the rotational position of that bearing and the workpiece portion mounted therein for precise control of the correction operation.

Accordingly, the present invention provides significant benefits which have not previously been achieved when attempting correction of metallic parts and products after initial manufacturing procedures. The invention allows correction of out of tolerance parts and products using a precise, computer controlled, reciprocating press ram for either major or minor corrections to provide reproducible results thereby increasing the number of acceptable, usable parts while significantly reducing rejection rates. The fixture of the present invention allows correction for longitudinal bow or straightening along a longitudinal axis of the part or product, twist or rotation correction relative to the axis of the part, or both bending/straightening and twist correction, all using a reciprocable press ram which is precisely and accurately controlled. The invention also allows the amount of correction to be monitored using either laser monitoring devices or digital encoders. The desired part tolerances can be programmed into the press control, while out of tolerance dimensions will be read and input into the machine control, and the press will proceed with the bow/straightening or twist correction as necessary and monitor the results to advise whether the correction procedure has been successful. Inaccurate, imprecise, manual correction methods using manually operated presses or hammers are, thus, eliminated. In addition, a wide variety of parts can be inspected and corrected using the fixture of the present invention by substituting different collets in the bearing structures so that different part shapes can be accommodated in an efficient, accurate manner with excellent correction results. In addition, the fixture of the present invention enables monitoring and correction of both bow or straightening and twist in a part such as a cast turbine blade to provide optimum correction results even though bow and twist correction may be interrelated and interdependent.

These and other objects, advantages, purposes and features of the invention will become more apparent from a study of the following description taken in conjunction with the drawings.

BRIEF DESCRIPTION OF THE DRAWINGS

FIG. 6 is an exploded perspective view of the workpiece support fixture of the present invention;

FIGS. 7A and 7B illustrate front and rear perspective views of the root end spherical bearing of the present invention;

FIGS. 8A and 8B illustrate front and rear perspective views of the shroud end spherical bearing of the present invention;

FIGS. 9A and 9B illustrate a preferred form of the disassembled and assembled collet for supporting the root section of a turbine blade workpiece;

FIGS. 10A and 10B illustrate a preferred form of the disassembled and assembled collet for supporting the shroud end of a turbine blade workpiece;

FIGS. 13A and 13B are sectional side elevations illustrating the mounting and support of a turbine blade workpiece in the collets and spherical bearings of the fixture of the present invention, while

DESCRIPTION OF THE PREFERRED EMBODIMENTS

Figure 1:
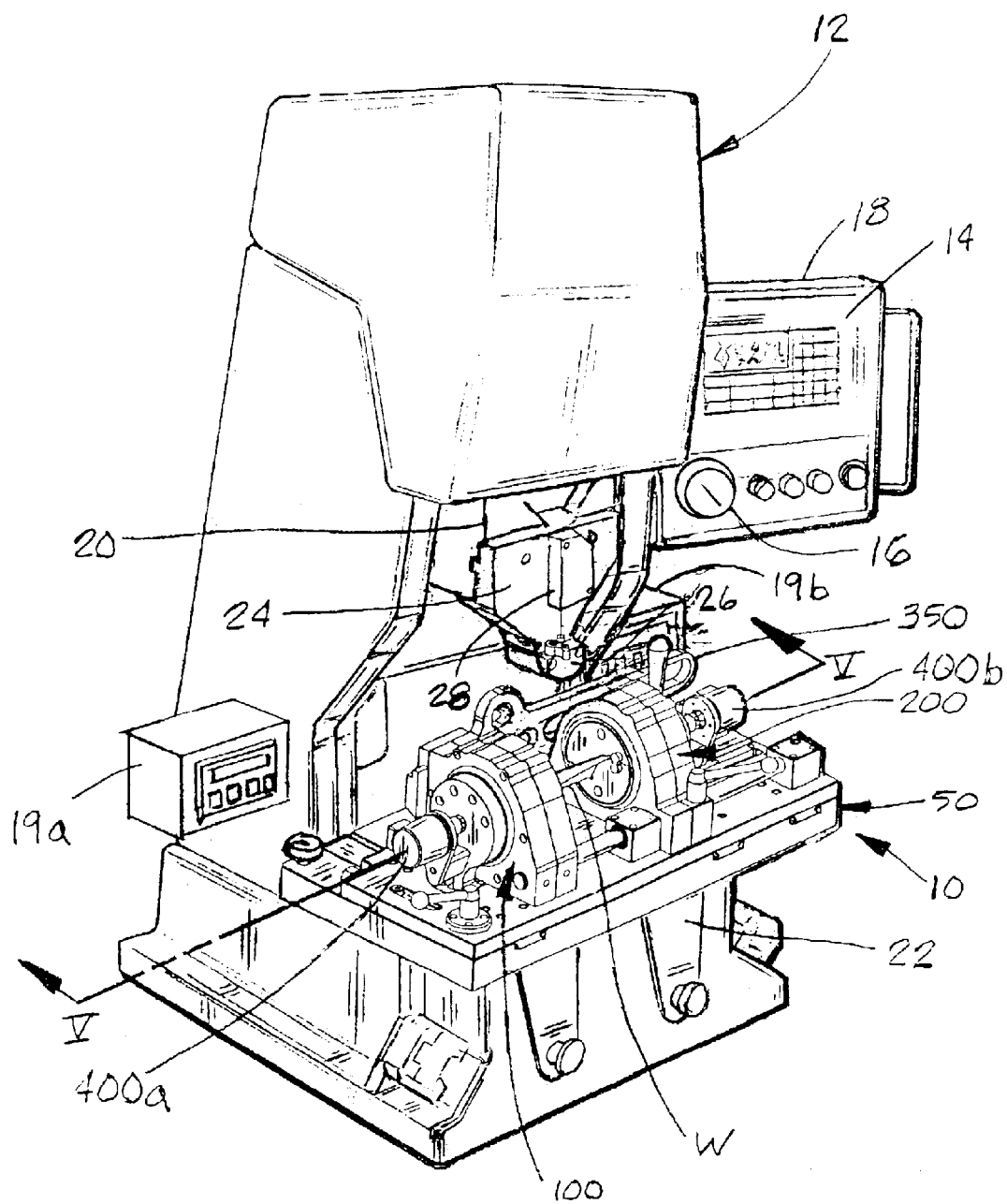
FIG. 1 is a perspective view of a bench-top press incorporating the workpiece holding fixture of the present invention in its workpiece support area.

Referring now to the drawings in greater detail, FIG. 1 illustrates the apparatus or fixture 10 for holding a workpiece such as an investment cast turbine blade or the like in position on a press 12 for engagement and operation by the press for bow or straightening correction and/or rotational or twist correction of the workpiece. Preferably, press 12 is of the type sold under the trademark PRO ACTIVE® by ProEnterpriz LLC of Grand Haven, Mich. and is a benchtop, servo-driven press incorporating a programmable control the input for which is accessed by keypad 14 or electronic handwheel 16 on an operator console 18. Press 12 further includes a reciprocable ram 20 and a workpiece support area 22 beneath ram 20 which receives fixture 10 as is more fully described below. Preferably, two digital displays 19a, 19b are mounted on the press. Each digital display is preferably a type MA 47 electronic display available from Siko Products of Dexter, Mich. In addition, ram 20 preferably has a stroke of about 4 inches and a speed of between about 0 and 2.5 inches per second as controlled by the programmable control. Ram 20 may incorporate a tool holder and laser pin receiving contact block 24, 26 as well as a laser sensor 28 which emits a laser beam L to accurately measure the amount of bending movement and position of the workpiece before and after engagement by the press ram during correction as will be more fully explained below. Laser sensor 28 is preferably that available from Banner Engineering Corporation of Minneapolis, Minn., under the trademark L-GAGE.

With reference to FIGS. 2–6, 14 and 15, fixture 10 for holding workpieces such as cast turbine blade W includes a base 50, a pair of workpiece support assemblies 100, 200 housing and supporting spherical swivel bearings 102, 202 which are adapted to support and allow pivotal and rotational movement of workpiece W when mounted thereon. A rotation or twist restricting member 280 is connected to swivel bearing 102 to restrict rotational movement of that bearing during bending correction of workpiece W by the press ram to a plane including the longitudinal support axis of the workpiece. Further, a rotation or twist imparting member 300 is connected to bearing 202 to impart rotational movement and twist correction to the workpiece W. Twist member or plate 300 is moved by pivot arm 350 which, in turn, is engaged and pivoted by the press ram as described more fully below. In addition, each of the workpiece support assemblies 100, 200 includes a digital encoder 400a, 400b respectively coupled to the swivel bearings 102, 202 in the respective workpiece support assembly to measure the rotational position of that bearing and, thus, the position of that portion of the workpiece W supported therein. As will be understood, such measurement indicates the tolerance range of the twist or rotation about the support axis of the workpiece W and the amount of rotation or twist correction imparted to the workpiece by means of rotation or twist member 300 and pivot arm 350.

Figure 2:
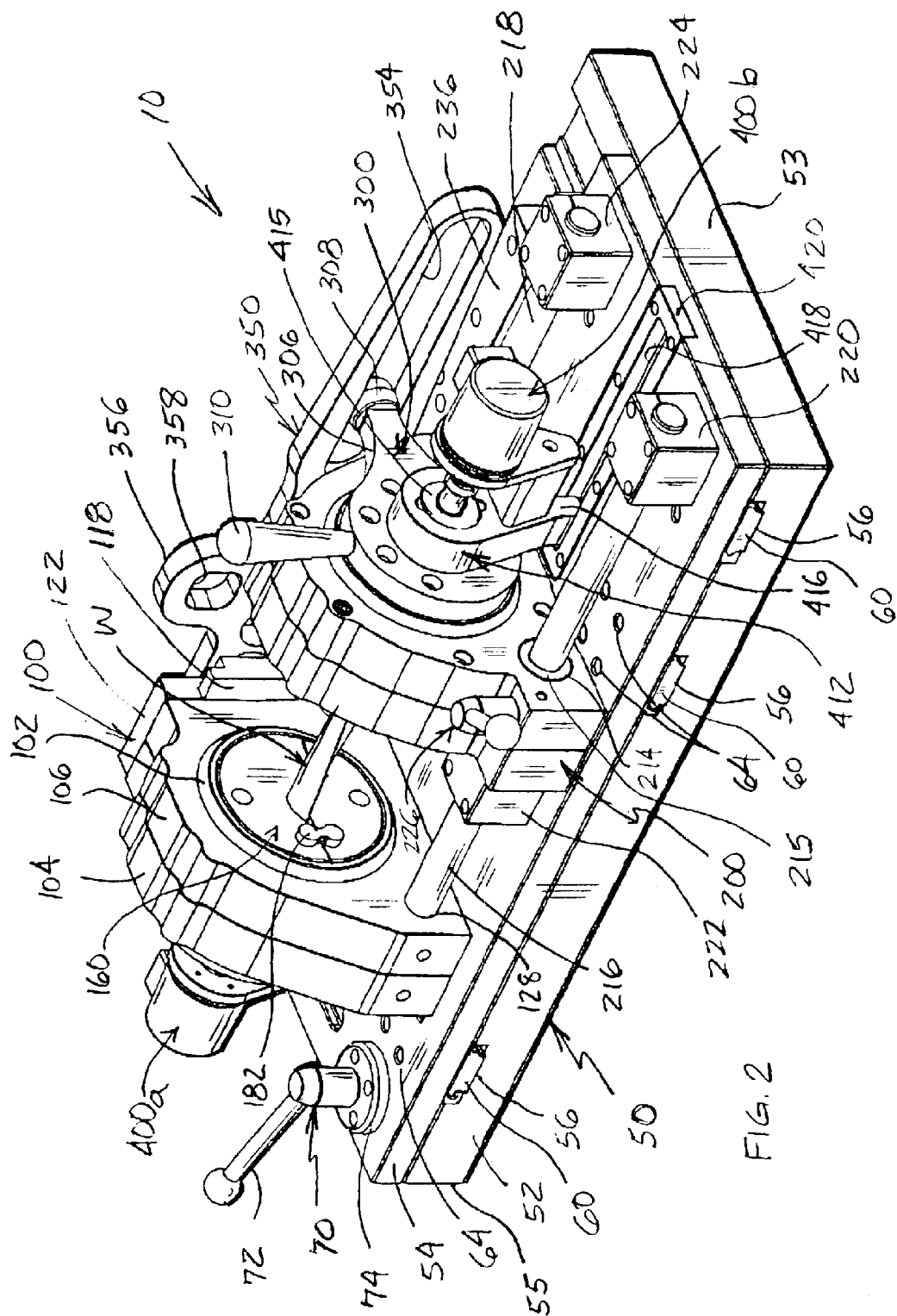
FIG. 2 is a front, top perspective view of the workpiece holding fixture of the present invention.
Figure 3:
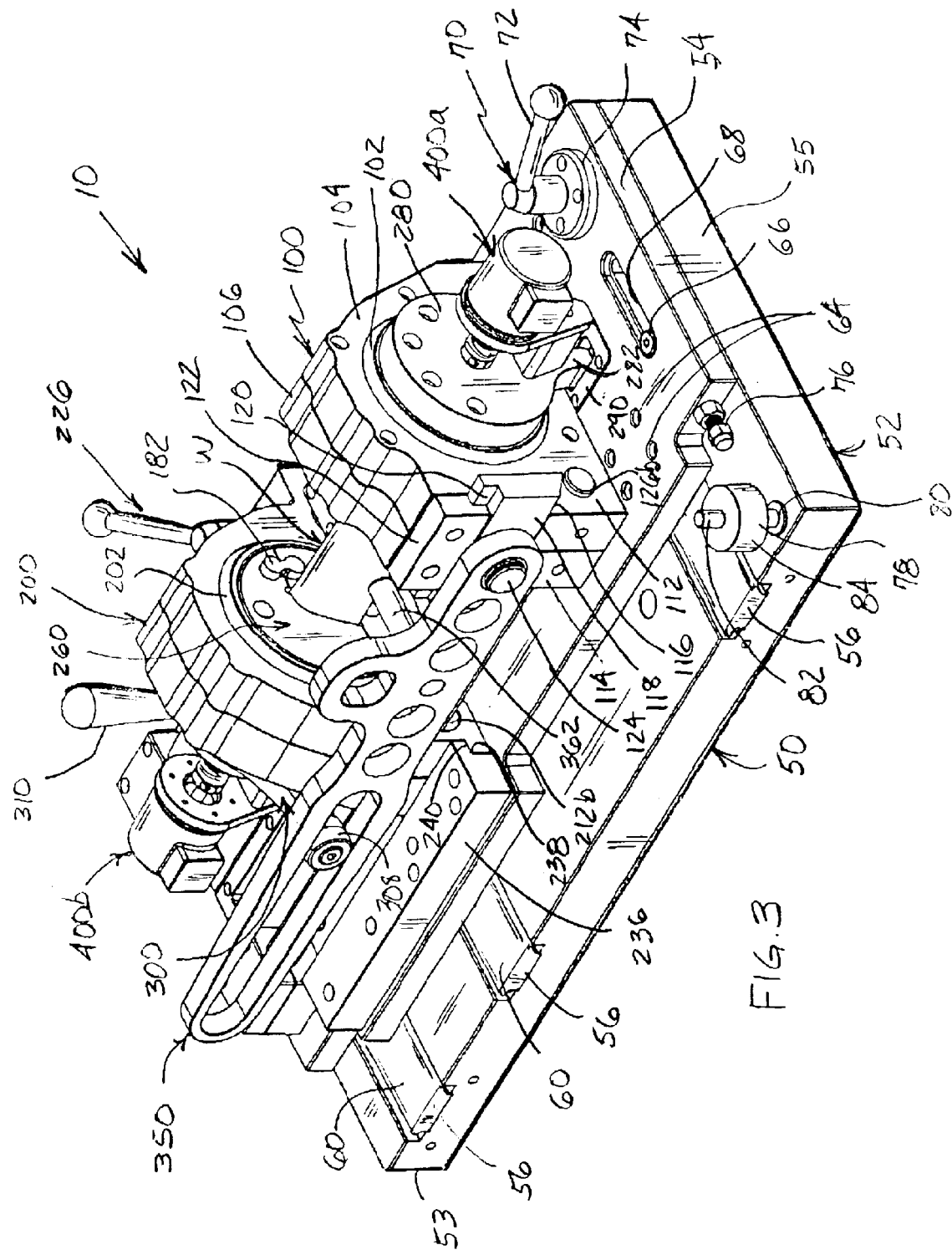
FIG. 3 is a top, rear perspective view of the workpiece holding fixture of the present invention.
Figure 4:
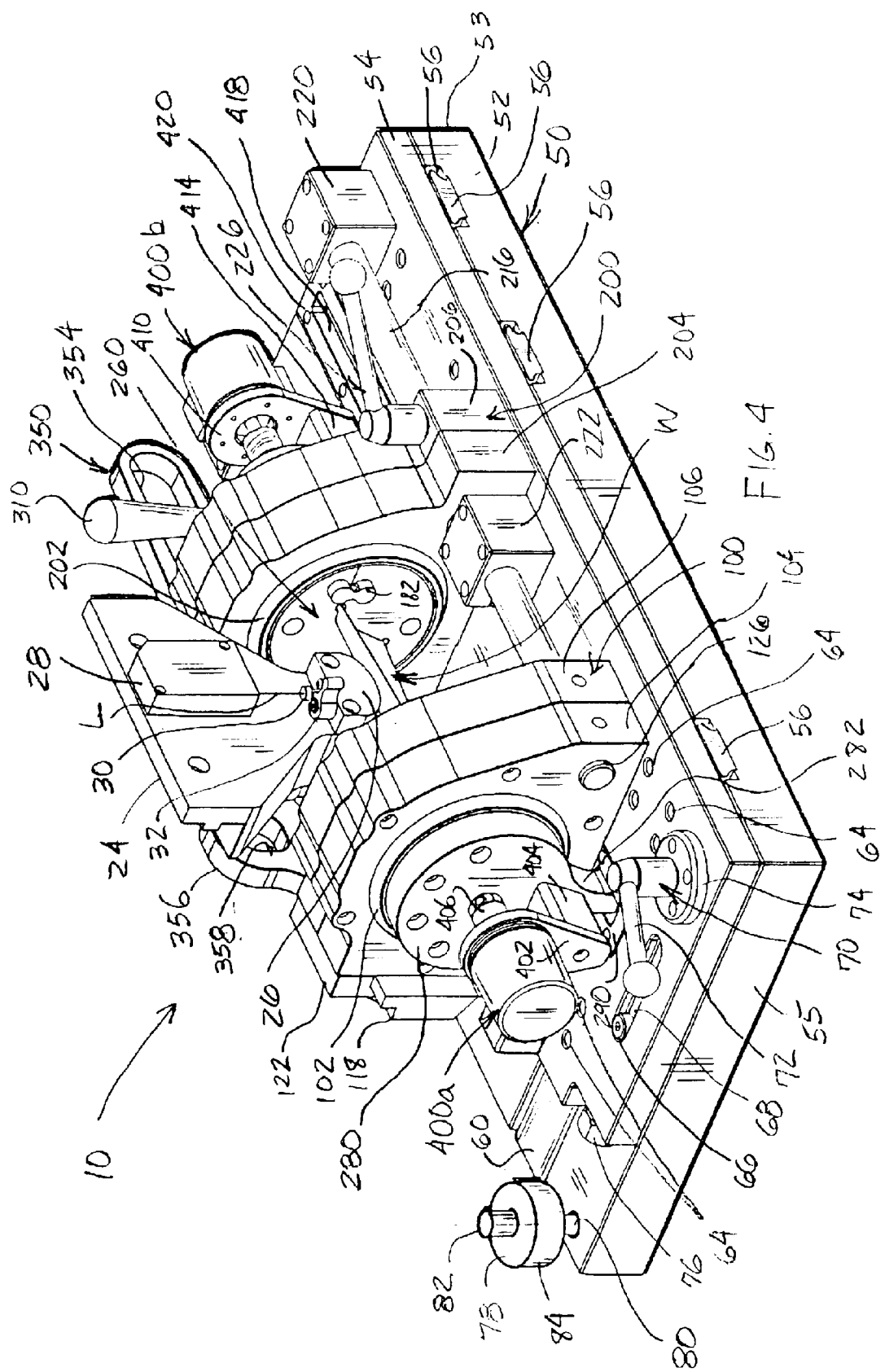
FIG. 4 is a top, front perspective view of the workpiece holding fixture of the present invention illustrating contact with a turbine blade workpiece by a portion of the reciprocating press ram with which the invention is useful.

As is best seen in FIGS. 2–6, base assembly 50 has a pair of generally rectangular plates formed from a strong, rigid material such as aluminum or steel, preferably aluminum, including a fixture base or support plate 52 and a bearing plate 54 slidably mounted thereon. Support plate 52 includes a series of three, parallel, elongated recesses or slots 56 extending parallel to side edges 53, 55 and spaced from one another across the length of the support plate. Each slot or recess 56 receives a linear guide which slidably supports and guides the front to back sliding movement of bearing plate 54 on support plate 52. Each linear guide 58 includes an elongated, rectilinear track member 60 and a guide block 62 (FIG. 5) containing a series of ball bearings therein which engage the top and side surfaces of the linear track members 60. A preferred linear guide may be obtained from THK Company, Ltd. of Tokyo, Japan, under the trademark THK-LM System. Guide blocks 62 are received in corresponding pockets on the underside of bearing plate 54 and secured therein by screws or fasteners 64 received through the exposed top surface of the bearing plate as shown in FIGS. 2–4. A cap screw 66 mounted in support plate 52 and received in elongated aperture 68 helps retain bearing plate 54 on support plate 52 and also guides and facilitates its rectilinear movement front to back. Bearing plate 54 may be secured in a desired position along slots 56 on linear guides 58 by means of a clamp 70 having an extending handle 72 and threadably engaged with a securing plate 74 on the top surface of bearing plate 54 by suitable screws or fasteners. Clockwise rotation of clamp 70 in plate 74 by means of handle 72 tightens a threaded shaft against the surface of support plate 52 to frictionally engage and hold bearing plate 54 in place at the desired position along slots 56. Counterclockwise rotation of clamp 70 by means of handle 72 releases bearing plate 54 for sliding movement along linear guides 58 until the desired position is reached when clamp 70 may be reengaged by opposite rotational movement.

As will be more fully understood below, a threaded stop 76 is mounted in the rear facing edge of bearing plate 54 for engagement with a removable abutment 78 telescoped into socket or aperture 80 adjacent the rear edge of support plate 52 as shown in FIGS. 3 and 4. Abutment 78 includes a shaft 82 and an encircling ring or tire 84. In one position, with one end of shaft 82 received in socket 80, stop 76 engages ring 84 to define one position of the bearing plate. However, when abutment 78 is inverted with the other end of shaft 82 inserted in socket 80, stop member 76 engages the shaft below ring 84 to allow further rearward movement of the bearing plate. These two positions of the bearing plate, as defined by the abutment 78, allow rapid but precise positioning of the bearing plate on linear guides 58 to properly position workpiece W under the contact block 26 of tool holder 24 on ram 20 when fixture 10 is mounted on press 12, especially when workpiece W is a cast turbine blade which may have either a clockwise or counterclockwise configuration. Stop 76 is adjustable into and out of the edge of plate 54 to further help precise positioning of workpiece W with respect to the press ram.

Referring again to FIGS. 2–6, workpiece support assemblies 100 and 200 are secured in alignment with one another on the top surface of bearing plate 54. Workpiece support assembly 100 is secured in a fixed position on bearing plate 54, while workpiece support assembly 200 is slidably movable toward and away from workpiece support 100 as will be explained more fully below.

Fixed workpiece support assembly 100 includes a pair of bearing mounts 104, 106 each of which includes a circular aperture 108, 110 extending therethrough. The surface of each aperture 108, 110 is spherically shaped such that when the bearing mounts 104, 106 are secured together as shown in FIGS. 2–5, the spherical outside surface of swivel bearing 102 is universally pivotally and rotationally movable therein. Bearing mounts 104, 106 correspond in shape to one another and are secured to one another by threaded fasteners extending therebetween and are secured to the top surface of bearing plate 54 by means of threaded fasteners extending through the bearing plate from the underside thereof into each of the bearing mounts.

Figure 14:
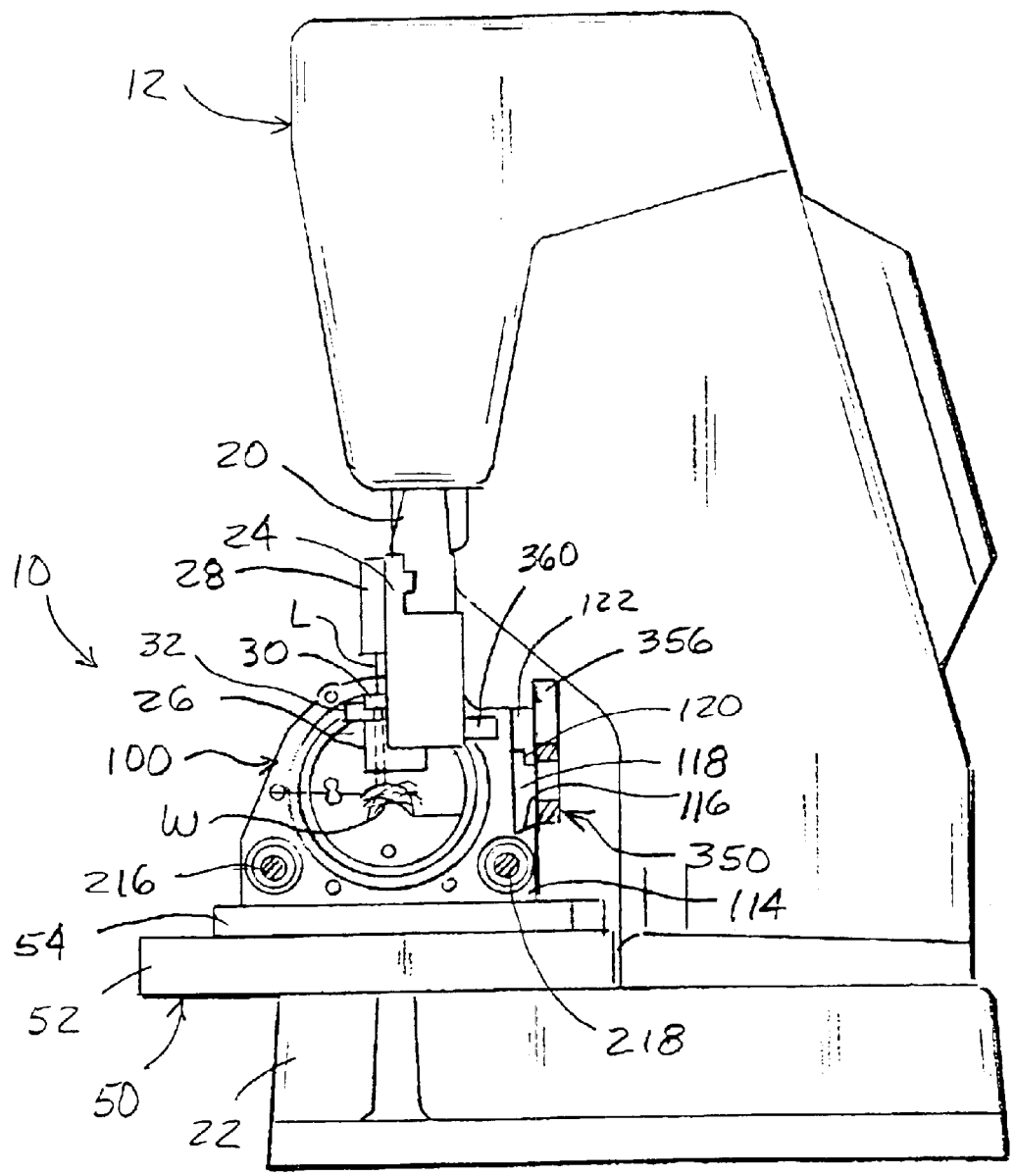
FIG. 14 is a sectional side elevation of the fixture of the present invention when mounted on a press with the workpiece held in the fixture being in alignment with the press ram and taken along line XIV—XIV of FIG. 5.
Figure 15:
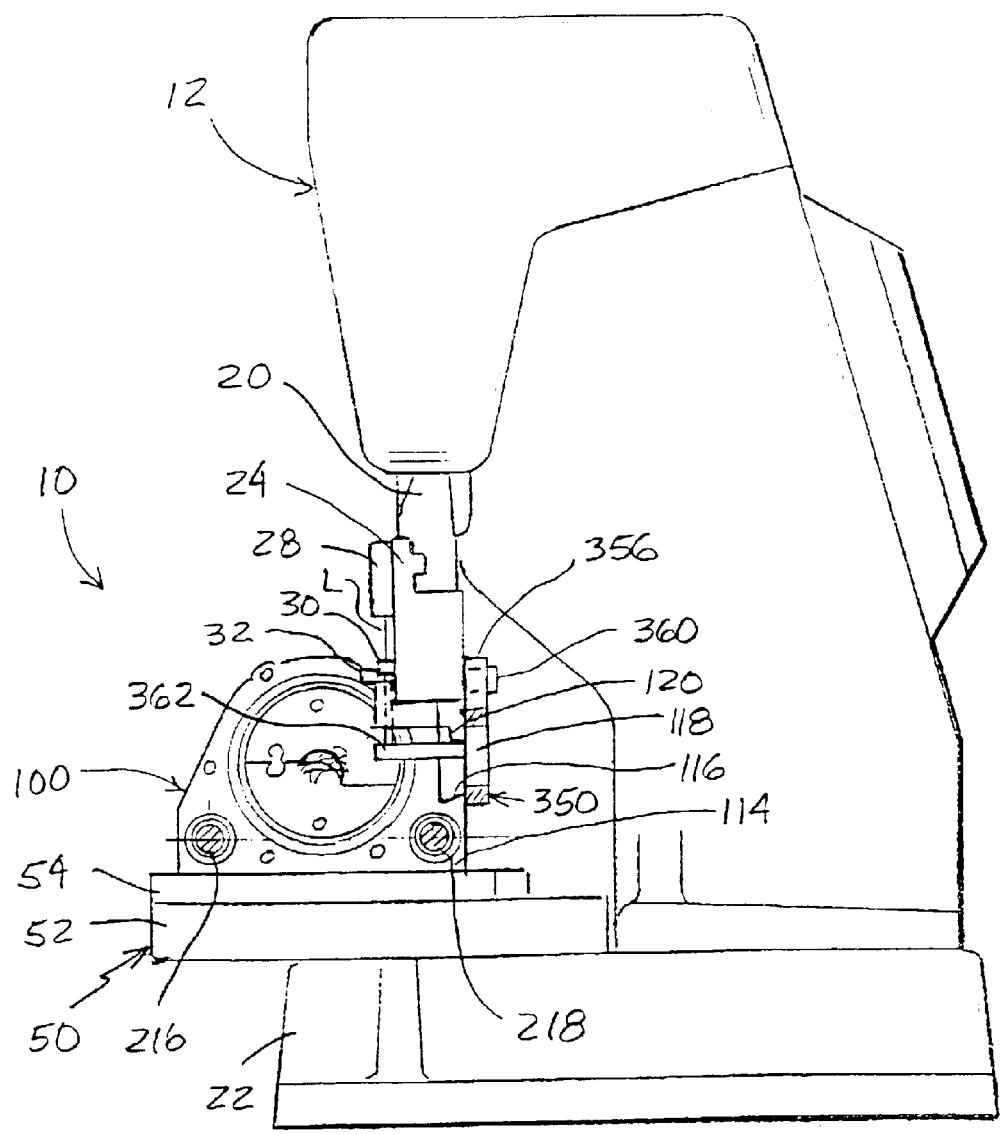
FIG. 15 is a sectional side elevation of the fixture of the present invention when supported on a press taken along line XV—XV of FIG. 5, the fixture being shown in its alternate position for engagement of the press ram with the rotation/twist imparting member or arm.

As will be best understood from FIGS. 3, 14 and 15, the rearwardly facing surface of each bearing mount 104, 106 includes a rearward extension 112, 114 extending partially up the height of each bearing mount and having an upwardly inclined surface 116 thereon receiving a dovetail slide 118 extending laterally across the surfaces 116 for sliding movement. Dovetail slide 118 includes a chamfered shoulder 120 on its upper edge adapted to mate with a corresponding chamfer on the inside surface of dovetail clamp 122 which is secured by threaded fasteners to each of the rear facing surfaces of bearing mounts 104, 106 as shown in FIG. 3. A cylindrical pivot 124 is secured in a circular recess on the outer surface of dovetail slide 118 by means of a threaded fastener extending through dovetail slide 118 from its rear surface as shown in FIG. 6. The axis of pivot 124 extends generally perpendicular to the support axis of workpiece W. Pivot arm 350 is pivotally received over pivot 124 by means of a circular aperture 352 and a cylindrical bearing 354 received therein and telescoped over the outer surface of pivot 124. Accordingly, when dovetail clamp 122 is loosened via its threaded fasteners, dovetail slide 118 may be moved laterally back and forth to position pivot 124 and, thus, pivot arm 350, for proper engagement with rotation imparting/twist member 300 as explained below.

Workpiece support assembly 200 also includes a pair of bearing mounts 204, 206, each of which also includes a circular aperture 208, 210 extending therethrough. Apertures 208, 210 include spherical surfaces adapted to mate and correspond with one another and receive the spherical outside surface of swivel bearing 202 therein. Bearing mounts 204, 206 correspond in shape to one another and are secured together with their inner faces engaged with one another by threaded fasteners extending from bearing mount 206 into bearing mount 204. In addition, bearing mounts 204, 206 include aligned, circular through apertures 212a, 214a and 212b, 214b adjacent front and rear edges of the bearing mounts for slidably mounting workpiece support assembly 200 on linear, cylindrical slide rods 216, 218 (FIGS. 2–6, 14 and 15). Slide rod 216 is mounted perpendicular to slots 56 and guides 58 and parallel to the front edge of bearing plate 54 in support blocks 220, 222 which are secured by threaded fasteners to the top surface of bearing plate 54. Slide rod 216 extends from support block 220 through apertures 214a and 212a, support block 222 and into aligned apertures 126a, 128a in bearing mounts 104, 106 as shown in FIGS. 2, 4 and 6. Similarly, slide rod 218 extends parallel to rod 216 but is closer to the rear edge of bearing plate 54 and is mounted between support block 224, which is secured with threaded fasteners to the top surface of bearing plate 54, and fixed workpiece support assembly 100. Rod 218 extends from support block 224 through apertures 214b, 212b and into apertures 128b, 126b adjacent the rear surface of bearing mounts 106, 104 as shown in FIGS. 2, 3, 5 and 6. When so mounted, workpiece support assembly 200 can slide toward and away from fixed workpiece support assembly 100 on slide rods 216, 218 parallel to the support axis of workpiece W in order to support workpieces W of differing lengths therebetween. Support block 222 serves as a stop limiting sliding travel of workpiece support assembly 200 toward workpiece support assembly 100.

Workpiece support assembly 200 may be clamped in any desired position along slide rods 216, 218 by means of a clamp assembly 226 mounted on bearing mount 206 as shown in FIGS. 2, 4 and 6. Clamp assembly 226 includes a clamping handle 228 having an extending shaft threadably mounted in aperture 230 in bearing mount 206. The handle shaft presses brake pin 232 downwardly into a cup 234 and against the surface of bearing plate 54 when handle 228 is rotated in a clockwise direction. Counterclockwise rotation of handle 228 loosens the clamp and relieves pressure on brake pin 232 thereby allowing sliding movement of workpiece support assembly 200 along slide rods 216, 218.

As is best seen in FIGS. 3 and 6, a twist hold down bar 236 is secured to the top surface of bearing plate 54 with threaded fasteners adjacent the rear edge of the bearing plate and includes a forwardly extending flange 240 defining shoulder 238 which is received over adjacent, rearwardly extending flanges on bearing mounts 204, 206. Flange 238 of hold down bar 236 allows the extending flanges of the workpiece support assembly 200 to slide therebeneath as the assembly is moved along slide rods 216, 218 but prevents the assembly from rotating around the axis of workpiece W when torque force is applied to the rotation imparting or twist member 300 by pivot arm 350 as will be explained more fully below.

Preferably, rod bearings such as ball bushings or linear bearings 215 (FIG. 2) are mounted in apertures 212a, 214a and 212b, 214b of workpiece support assembly 200 through which slide rods 216 and 218 are received. Suitable ball bushing linear bearings may be obtained from Thompson Industries, Inc. of Port Washington, N.Y., as Smart Multi-Track Closed Bearings under Model No. SMTEM25.

Referring now to FIGS. 5, 7, 8, 12 and 13, spherical swivel bearings 102, 202 each comprise an aluminum ball member having truncated sides and a spherical outer surface preferably coated with a nickel Teflon coating for reducing friction within the bearing mounts on surfaces 108, 110 and 208, 210. The truncated inner side 140 of swivel bearing 102 includes a concentric, circular recess or collet cavity 142 adapted to receive cylindrical collet assembly 160 therein when fitted around a workpiece such as a cast turbine blade W. Recess 142 extends approximately one-third of the way into bearing member 102 and includes a bottom wall 144 in which is formed a clearance cavity or pocket 146 adapted to receive the root end of a cast turbine blade workpiece W as shown in FIGS. 5, and 11–13. The outer or opposite side 148 of swivel bearing 102 (FIG. 7B) includes a central circular recess 150 for receiving and mounting an encoder shaft as explained below and a concentric, dovetail groove 152 having sides tapering toward one another as they progress toward the outer surface of the swivel bearing. Dovetail groove 152 is adapted to receive a pair of quarter circular, radial T-nuts having a corresponding tapered, dovetail shape in section which are received within groove 152 to clamp rotation or twist restricting member 280 to the swivel bearing as explained below. Swivel bearing 102 also includes a pair of parallel guide pins 154, 156 extending outwardly from bottom wall 144 into collet cavity 142 to guide receipt of the cylindrical collet 160 therein when mounting a workpiece as explained below.

Figure 5:
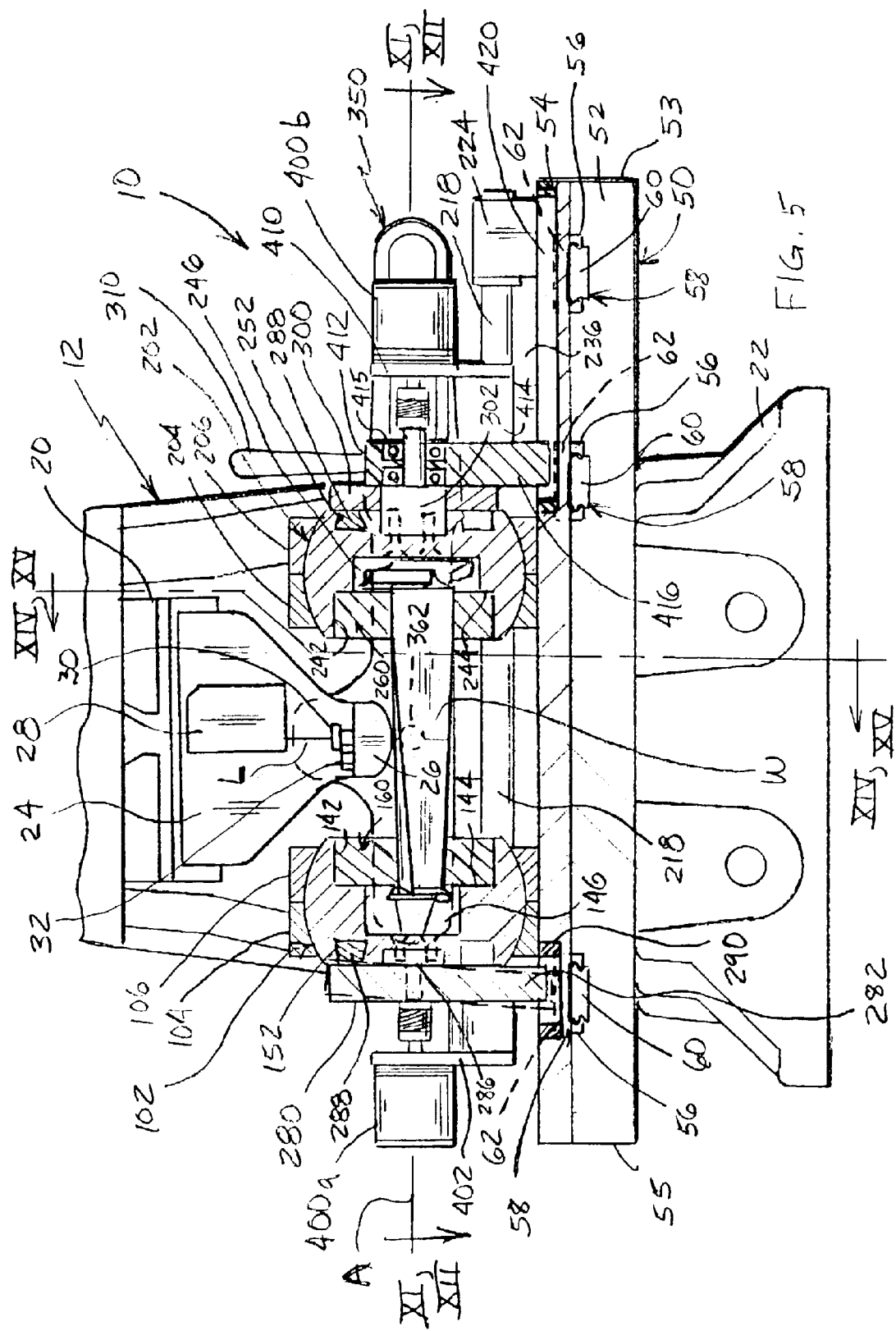
FIG. 5 is a sectional front elevation of the fixture of the present invention taken along plane V—V of FIG. 1, the fixture being positioned on the workpiece support area of the press with the press ram contacting the turbine blade workpiece.
Figure 11:
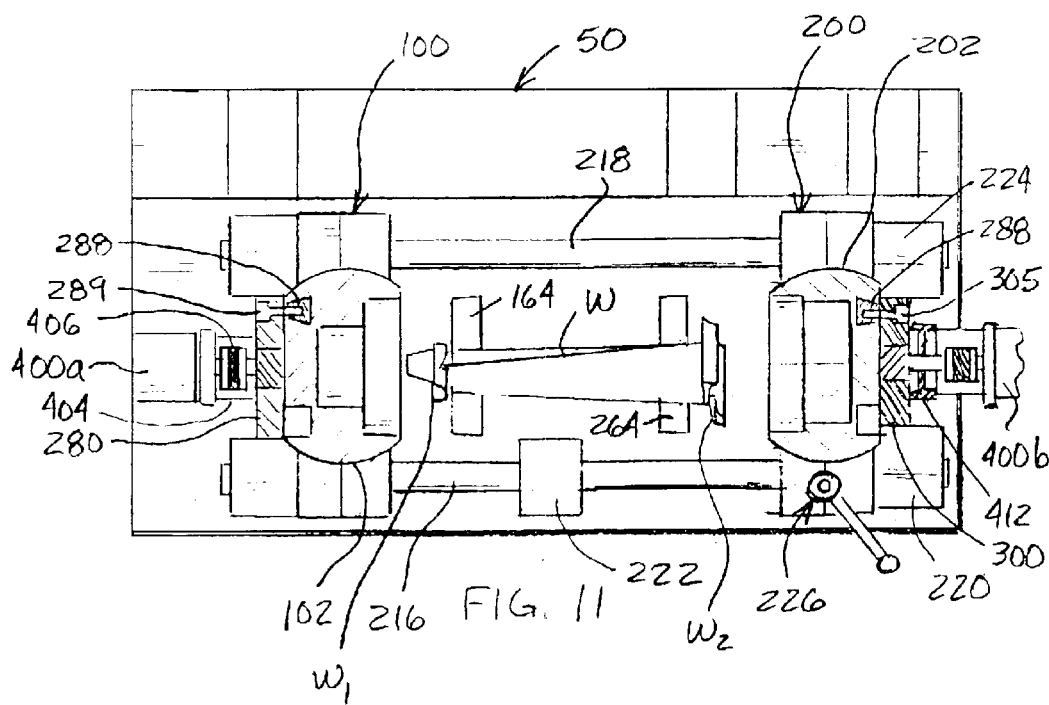
FIG. 11 is a sectional top plan view of the fixture of the present invention taken long plane XI—XI of FIG. 5 and shown in the position of FIG. 15 and prior to mounting a turbine blade workpiece in the workpiece supports.
Figure 13A:
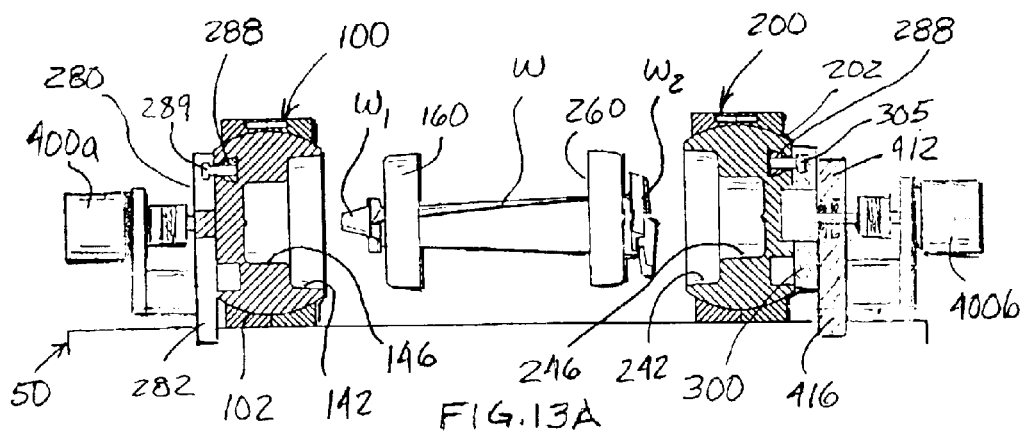
Figure 13B:
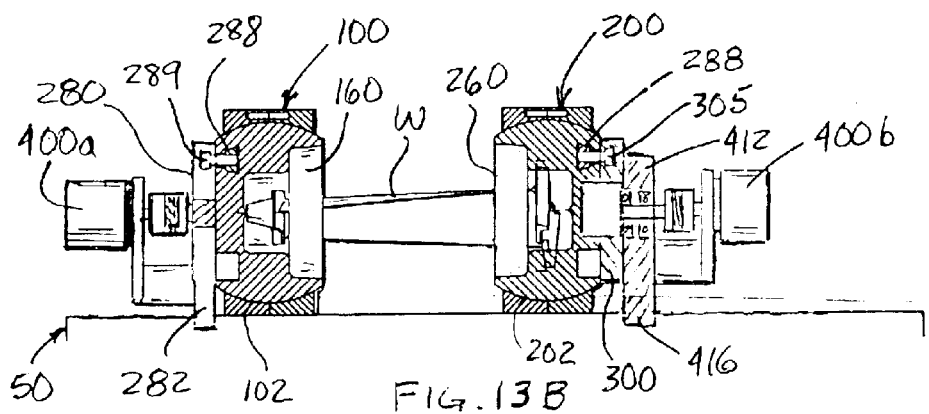

Spherical swivel bearing 202 is similar in substantially all respects to swivel bearing 102 and includes a collet receiving recess or cavity 242 on inner side 240 with a clearance cavity or recess 246 formed in bottom wall 244 of collet cavity 242. A pair of collet receiving guide pins 254, 256 extend outwardly from bottom wall 244 into collet cavity 242 as shown in FIG. 8A. Clearance cavity 246 is larger than clearance cavity 146, in order to accommodate the larger shroud end of turbine blade workpiece W as shown in FIGS. 5, 11 and 13. Likewise, the opposite or outer side 248 of swivel bearing 202 includes a dovetail groove 252 adapted to receive radial T-nuts for clamping rotation or twist imparting member 300 to the outer side of bearing 202 in the same manner as in swivel bearing 102, as well as a central circular recess 250 for receiving an encoder mounting shaft 302 (FIG. 6) as explained below. Swivel bearings 102, 202 may be modified to include openings therethrough in place of cavities 146, 246 such that elongated workpieces can be received and supported while extending entirely through the bearings. In such case, the mounting and configuration of twist restricting member 280, twist plate 300, and the mounting of shafts 286, 305 would be altered to allow support of such longer workpieces.

Referring now to FIGS. 5 and 9–13, each swivel bearing 102, 202 is adapted to receive a cylindrical collet assembly 160 or 260, respectively, in which workpiece W is received prior to mounting in the swivel bearings. As is best seen in FIGS. 9 and 10, collet assembly 160 includes a pair of partially circular collet members 162, 164 preferably formed from bronze which correspond to one another and are slidably mounted via guide pins 166, 168 on collet member 164 which are received in corresponding apertures in collet member 162 such that a disk-like assembly is formed. Located centrally in collet assembly 160 is a workpiece receiving aperture 170 defined by recessed or concave surface 172 in collet member 162 and convex surface 174 in collet member 164. When the collet members are assembled, aperture 170 defines the precise outer shape of the particular workpiece to be corrected and straightened while using fixture 10. In the preferred form of collet assembly 160 shown in FIGS. 9A and 9B, aperture 170 defines the outer shape of a section of a clockwise configured cast turbine blade adjacent the root end of the blade. Collet assembly 160 also includes a pair of aligned guide apertures 176, 178 adapted to be received over guide pins 154, 156 in swivel bearing 102 when collet assembly 160 is slidably received in collet cavity or recess 142 as explained above. In addition, collet members 162, 164 each include a portion of a FIG. 8 shaped cavity 180 adapted to slidably receive a dog bone shaped retaining member or key 182 after the collet members are assembly around the workpiece and prior to insertion of the collet assembly 160 in collet recess or cavity 142 of swivel bearing 102. Dog bone retaining member or key 182 (FIGS. 2–4 and 6) prevents separation of the collet members after assembly around the workpiece.

Similarly, collet assembly 260 shown in FIGS. 10A and 10B includes partially circular, bronze collet members 262, 264 slidably assembled with one another via guide pins 266, 268 which are mounted on collet member 264 and received in collet member 262. A central aperture 270 formed by recessed or concave surface 272 in collet member 262 and convex surface 274 in collet member 264 defines the exterior shape of a section of the turbine blade workpiece at the opposite or shroud end of the turbine blade from that held by collet member 160. Aligned apertures 276, 278 receive guide pins 254, 256 in swivel bearing 202 when collet assembly 260 is received in collet recess or cavity 242 after mounting of the workpiece therein. In addition, a FIG. 8 shaped recess 280 formed by portions thereof in the respective collet members 262, 264 receives a dog bone retaining member or key 182 to hold the collet assembly together after mounting on the workpiece but prior to mounting in collet cavity 242 of swivel bearing 202. It will be understood that the configuration of apertures 170, 270 can be changed to match the outside shape of the desired workpiece W to be corrected.

Referring now to FIGS. 3–6 and 11–13, swivel bearing 102 includes a rotation or twist restricting member 280 to restrict the bearing from free, unrestrained pivotal or rotational movement. More specifically, swivel bearing 102 includes a rotation resisting, circular key plate 280 preferably formed from steel and including a radially projecting arm or flange 282. Key plate 280 is concentrically mounted with swivel bearing 102 via a circular central aperture telescoped over the projecting end of an encoder shaft member 286 which is secured recess 150 of swivel bearing 102 by threaded securing screws 287 (FIG. 7A) passed from clearance cavity 146 into the shaft member. A series of threaded fasteners 289 (FIGS. 11–13) are passed from the outer side of key plate 280 therethrough to engage a pair of quarter circular, radial T-nuts 288 which are received in dovetail groove 152 of swivel bearing 102. When the T-nuts are tightened within groove 152 by means of threaded fasteners 289, the swivel bearing 102 is thereby fixedly clamped to the key plate. Flange or projection 282 of key plate 280 is received in a slot member 290 (FIGS. 3–6). Slot member 290 includes a slot slightly wider than the width of flange or projection 282, but has a length greater than the thickness of the flange. Hence, when workpiece W is engaged by the ram of the press on which fixture 10 is mounted, swivel bearing 102 and key plate 280 can pivot in the plane of the support axis of the workpiece but are restrained from rotating about that support axis by the engagement of projection 282 with the parallel walls of slot of member 290 as shown in the phantom lines in FIG. 5.

As is best seen in FIGS. 2 and 6, another rotation or twist mechanism is provided to control the rotation of swivel bearing 202 in workpiece support assembly 200. Rotation or twist plate 300 is secured to the outer face of swivel bearing 202 in a manner similar to that for key plate 280 on swivel bearing 102. More specifically, twist plate 300 is formed from steel and telescoped over encoder shaft 302 which is secured in recess 250 of swivel bearing 202 by means of threaded fasteners 303 (FIG. 8A) passed from clearance cavity 246 through the swivel bearing into the encoder shaft. Twist plate 300 includes a central aperture 304 which is received over encoder shaft 302. Twist plate 300 is secured to the outer face of swivel bearing 202 by a series of threaded fasteners 305 (FIGS. 11–13) passed through the swivel plate and engaging quarter circular radial T-nuts 288 received in dovetail groove 252 of swivel bearing 202 in a manner similar to that for radial T-nuts 288 in swivel bearing 102. When fasteners 305 are tightened, the radially T-nuts are tightened within groove 252 to fixedly clamp and secure twist plate 300 with respect to swivel bearing 202. In addition, twist plate 300 includes a radially projecting arm or flange 306, the outer end of which includes a cam roller 308 rotatably mounted on a cap screw at the end of arm 306. Cam roller 308 is received within elongated slot 354 of pivot arm 350. In addition, pivot arm 350 includes a press ram engaging projection 356 having an aperture 358 therein adapted to receive an engagement pin 360 on the rear side of the press ram as shown in FIG. 15 and described below. Accordingly, when press ram 20 is raised with engagement pin 360 engaging projection 356 via aperture 358, arm 350 is pivoted about pivot member 124 via aperture 352 and bearing 354 described above. The elongated end of arm 350 is, thus, rotated such that arm 306, twist plate 300 and swivel bearing 202 are rotated simultaneously while cam roller 308 rolls along the surface of elongated aperture 354 in the pivot arm. Thus, reciprocal movement of press ram 20 is converted into rotational movement of twist plate 300 and swivel bearing 202 by means of pivot arm 350 thereby imparting rotation or twist to the workpiece W which is held in collet assemblies 160, 260 in swivel bearings 102, 202 so that the twist of the workpiece can be corrected.

It will be understood that key plate 280 and twist plate 300 both allow initial presetting of the position of the swivel bearings 102, 202, respectively, prior to any correction procedure. This is done by loosening the threaded fasteners 289, 305 clamping the key plate 280 and twist plate 300, respectively, to their swivel bearings, followed by rotating the bearings, collet assemblies and workpiece W with respect to those plates while radial T-nuts 288 slide in their respective grooves 152, 252 to precisely align the workpiece as desired before correction procedures are begun. Thereafter, threaded fasteners 289, 305 can be retightened to hold swivel bearings 102, 202 in position due to the engagement of arm 282 in slot member 290 and the engagement of arm 306 and cam roller 308 in slot 354 of pivot arm 350.

Referring again to FIGS. 2–6, measurement of the radial position of the swivel bearings in workpiece support assemblies 100, 200 is accomplished via digital encoders 400a, 400b which are mounted on shafts 286, 302, respectively. Preferably, each of the encoders 400a, 400b is an incremental rotary encoder such as the 500 series encoder sold by Heidenhain Corporation of Schaumberg, Ill. One encoder is mounted to swivel bearing 102 by means of encoder plate 402 which is secured to the outer surface of key plate 280 by an encoder extender 404. The measuring shaft of encoder 400a is coupled to the extension of shaft 286 passing through key plate 280 by means of a flexible coupler 406 such as the multi-helix flexible beam coupling sold by Rino Mechanical Components Inc. of Freeport, N.Y. Hence, encoder 400a on swivel bearing 102 measures relative rotation of swivel bearing 102 with respect to key plate 280 although, when initially set up and key plate 280 and swivel bearing 102 are secured to one another prior to any correction procedure, this encoder will automatically measure the rotational start position of the workpiece.

On swivel bearing 202, a separate digital encoder 400b is secured to encoder mounting plate 410 which, in turn, is secured to the outer surface of rotation or twist resisting member 412 via encoder extension 414. As is best seen in FIGS. 2, 5 and 6, rotation resisting member 412 includes a circular section having a central aperture receiving a pair of angular contact ball bearings 415 therein which engage shaft 302 to allow rotation of the shaft with respect to the twist resisting member. Member 412 includes a radially projecting arm 416 which engages an elongated slot 418 in slot member 420 to prevent rotation of member 412 and, thus, encoder 400b when twist plate 300 and shaft 302 are rotated by pivot arm 350. The shaft of encoder 400b projects through encoder mounting plate 410 and is coupled to the extension of shaft 302 projecting through member 412 by means of a flexible coupler 422 which is substantially similar to coupler 406. Accordingly, as swivel bearing 202 rotates by means of pivot arm 350 and twist plate 300, encoder 400b measures the relative rotation of the bearing and the workpiece portion held in collet assembly 260 and provides a readout of such rotational movement on digital display 18.

Figure 12:
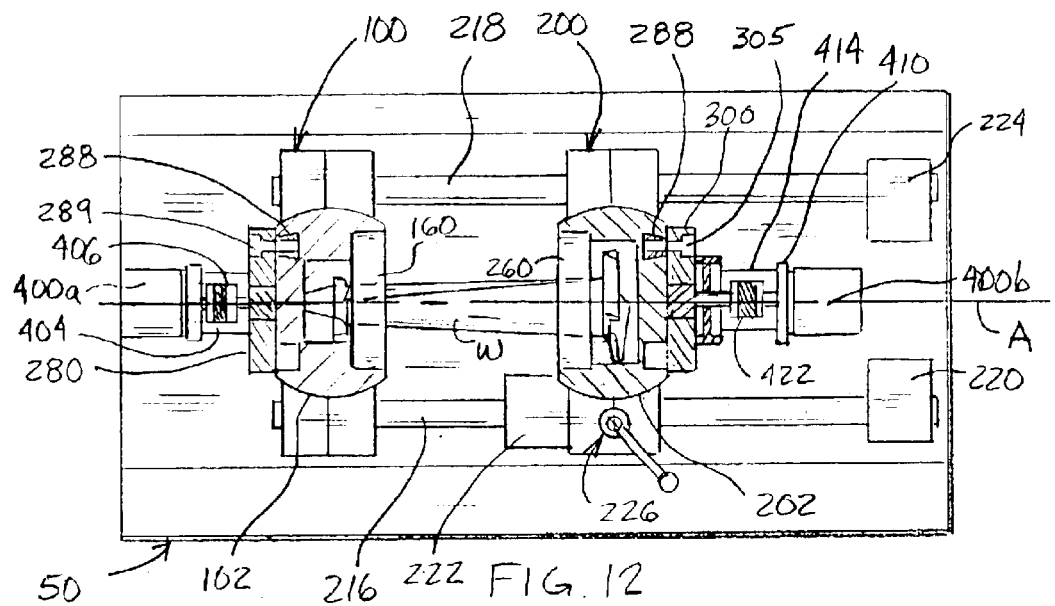
FIG. 12 is a sectional plan view of the fixture of the present invention taken along plane XII—XII of FIG. 5 and shown in the position shown in FIG. 14 and after the turbine blade workpiece has been mounted in the workpiece supports.

The use of fixture 10 for supporting a workpiece W such as a cast turbine blade or the like for correction by bending using press 12 including bow correction and straightening and twist correction will now be understood. A turbine blade W, having a root end W1 and a shroud end W2 and typically produced by investment casting, is positioned between swivel bearings 102, 202 in workpiece support assemblies 100, 200 as shown in FIG. 11. Prior to loading of the workpiece in the swivel bearings, clamp 226 is loosened and assembly 200 is slid outwardly toward the outer edge of bearing plate 54 on slide rods 216, 218 to provide sufficient clearance for loading and insertion of the workpiece. Collet assemblies 160 and 260 are fitted around the respective ends W1, W2 of the turbine blade workpiece by successively placing collet member 164 under the root end and slidably assembling collet member 162 thereover while securing same with FIG. 8 key member 182. Assembly of collet members 264, 262 is made in the same manner over a portion of the turbine blade adjacent shroud end W2. Thereafter, collet assembly 160 with workpiece W held therein is moved axially into alignment with spherical bearing 102 such that collet assembly 160 is guided into collet recess 142 by means of guide pins 154, 156. Subsequently, workpiece support assembly 200 is slid toward workpiece support assembly 100 on slide rods 216, 218 with collet assembly 260 being slidably received in collet cavity 242 of swivel bearing 202 as shown in FIG. 12. The workpiece support assembly 200 is then locked in place with clamp assembly 226 via handle 228. Block 222 positions the workpiece support assembly 200 in the proper position for the length of workpiece W. Should longer pieces be loaded between workpiece support assemblies 100, 200, spacers can be inserted between block 222 and workpiece support assembly 200 over slide rod 216 if desired. When loaded as shown in FIGS. 11 and 12, turbine blade workpiece W is supported along a longitudinal axis A (FIGS. 5 and 12) aligned with the centers of swivel bearings 102, 202 while the root end W1 and shroud end W2 of the turbine blade are received in the respective clearance cavities 146, 246 as explained above. Support axis A is parallel to slide rods 216, 218 and generally perpendicular to the pivot axis of pivot 124 for arm 350.

Following loading of the workpiece W in the swivel bearings 102, 202, the root and shroud end swivel bearings are initially aligned and preset in the following manner. Fasteners 289 clamping key plate 280 to the outside surface of swivel bearing 102 are loosened such that radial T-nuts 288 may slide in groove 152. This allows swivel bearing 102 to be rotated within workpiece support assembly 100 until the crown of the outside surface of the turbine blade W is precisely aligned with the support axis along the centers of swivel bearings 102, 202. Simultaneously, fasteners 305 extending through twist plate 300 are loosened to allow radial T-nuts 288 to slide within groove 252 of swivel bearing 202 to allow alignment of the workpiece with the support axis as above. If desired, the workpiece may be rotated to a greater or lesser extent depending on the desired contact area with the press ram for straightening and correction. Thereafter, fasteners 289 and 305 are tightened to clamp key plate 280 to swivel bearing 102 and twist plate 300 to swivel bearing 202 to provide an initial correction position. In this position, arm 306 of twist plate 300 extends substantially horizontally with cam roller 308 received in slot 354 of pivot arm 350 which is at rest. Handle 310 extending radially from the edge of twist plate 300 may be used to help rotate the twist plate with respect to bearing 202 for ease of adjustment.

Either subsequent to or prior to the loading of the workpiece as described above, bearing plate 54 may be loosened with respect to support plate 52 via clamp 70 and slid to its rearward position shown in FIGS. 2–4, 12 and 14. During such movement, headed pin 30 which is slidably mounted in contact block 26, is held up by a rotatable cam retainer 32 (FIGS. 1, 4 and 5). In this rearward position, the axis of workpiece W is aligned with contact block 26 of ram tool holder 24 as shown in FIG. 14. Press ram 20 may then be lowered until the bottom of contact block 26 engages the upper surface of workpiece W. Cam 32 is rotated away from headed pin 30 and pin 30 (FIGS. 14 and 15) is biased downwardly through contact block 26 against the surface of the workpiece by a spring (not shown) in block 26. In this position, laser sensor 28 emits laser beam L striking the top of headed pin 30 and sends an initial reading of the pin position to the press control. Similarly, the initial readings for the rotational positions of swivel bearings 102, 202 are provided by encoders 400a, 400b, which are coupled to the radial position of each swivel bearing respectively upon initial set up. Those radial positions are communicated to the respective digital readouts 19a, 19b and are used to determine whether the cast turbine blade is radially out of tolerance from required dimensions and, if so, by how much.

Figure 13C:
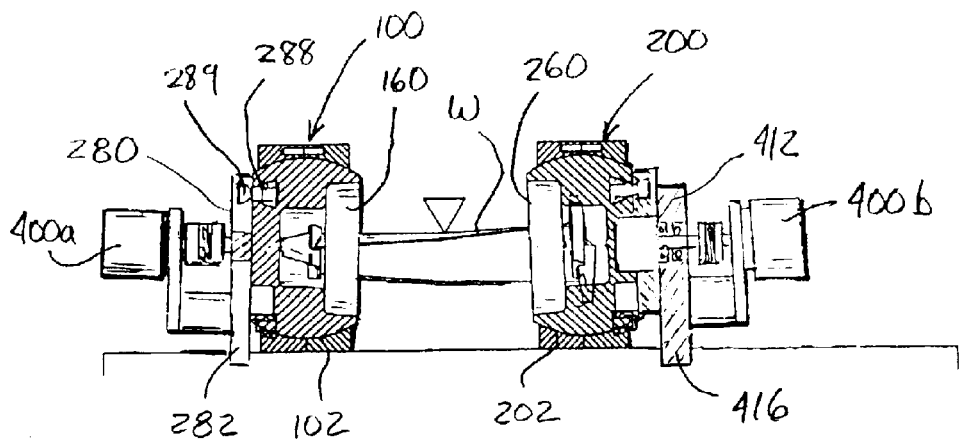
FIG. 13C is a sectional side elevation illustrating bending correction of the turbine blade workpiece when supported in the spherical bearings in the fixture.

Thereafter, once initial set up of the fixture 10 is completed as set forth above, correction is initiated when the programmable control of press 12 is enabled to operate reciprocable press ram 20 in a downward motion by a sufficient amount to bend the workpiece and correct the bow and straighten the workpiece. During such press movement and engagement, swivel bearings 102, 202 can pivot in the plane of the support axis of the workpiece as shown in FIGS. 5 and 13C while being prevented from rotating by the engagement of key plate extension 282 with slot member 290 and the engagement of cam roller 308 on arm 306 of twist plate 300 with slot 354 of pivot arm 350. However, rotation or twist resisting member 412 which is free to pivot in the plane of the workpiece support axis by means of extension 416 in slot 418 maintains the initial rotational position of encoder 400b such that encoder 400b can measure any rotational movement of the shroud end of the workpiece in swivel bearing 202 should it occur during the bow straightening correction described above.

Should it be necessary to bend areas of the workpiece closer to one or the other of swivel bearings 102, 202, the press ram tool holder 24 may be loosened via its securing fasteners with respect to press ram 20 and slid laterally toward or away from one or the other of the swivel bearings to reposition the contact block 26 for engagement with the desired area of the workpiece along the length of the workpiece and its support axis. During any of the press ram movements for straightening of the workpiece for bow correction, laser sensor 28 continuously senses and reads the top surface of laser pin 30 to measure the amount of workpiece deflection and, thus, the correction that has occurred. Simultaneously, any rotational movement of the turbine blade around the support axis is measured by encoder 400b measuring the amount of rotational position change of the shroud end during such bow correction.

Once sufficient bending has taken place to correct the bow of the workpiece along the longitudinal extent of the support axis, fixture 10 may be moved forwardly to the position shown in FIG. 15 to allow rotational or twist correction. In order to pursue such twist correction, clamp 70 for bearing plate 54 is loosened and bearing plate 54 is slid forwardly until aperture 358 of pivot arm 350 receives engagement pin 360 of ram tool holder 24 as shown in FIG. 15 all while headed pin 30 is held up by cam 32. Clamp 70 may then be tightened to hold bearing plate 54 in that position. In this position, contact block 26 is out of contact with the workpiece. However, headed pin 30 is released from cam 32 and extends downwardly to contact laser read pin 362 which extends forwardly from pivot arm 350 as shown in FIG. 3. Thereafter, upward reciprocation of press ram 20 and, thus, tool holder 24, causes upward movement of pivot arm 350 and a pivotal motion around pivot 124. Simultaneously, arm 306 of twist plate 300 is rotated upwardly creating a simultaneous rotation of swivel bearing 202 and, thus, the shroud end W2 of workpiece W which is held in collet assembly 260 within that swivel bearing. Consequently, the reciprocal motion of the press ram is converted to rotational motion of the workpiece via twist arm 300 and swivel bearing 202. That rotation is sensed by the laser sensor 28 and the rotational changes are measured by encoder 400b.

Although the operation of fixture 10 has been described with bow correction or straightening of the workpiece occurring first prior to radial or twist correction, it is also possible to correct the radial position or twist of the workpiece prior to making any bow correction. Also, both types of correction may be made multiple times and in any desired order.

As will be understood from FIGS. 14 and 15, the rotational position of the workpiece, in this case, a turbine blade, may be changed and modified for contact with contact block 26 of tool holder 24 as desired for bow correction while the initial rotational position of the workpiece may be changed with respect to twist arm 300 and pivot arm 350 to allow rotational or twist correction as desired. In the event tool holder 24 is shifted laterally on press ram 20 thereby changing the position of engagement pin 360, dovetail slide 118 may be moved to change the position of pivot arm 350 and aperture 358 after loosening dovetail clamp 122 as described above. At all times, twist hold down bar 236 maintains the position of workpiece support assembly 200 on bearing plate 54 during both bow correction and twist correction as described above.

While several forms of the invention have been shown and described, other forms will now be apparent to those skilled in the art. Therefore, it will be understood that the embodiments shown the drawings and described above are merely for illustrative purposes, and are not intended to limit the scope of the invention which is defined by the claims which follow.

What is claimed is:

1. A fixture for supporting a workpiece on a press for bending and/or twist correction of the workpiece, the press being of the type having a workpiece support area and a movable ram, said fixture comprising:

a base adapted for support on the press workpiece support area;

a pair of workpiece supports, said workpiece supports being mounted at spaced locations on said base, and each including a bearing having a workpiece mount for receiving a workpiece therein, the workpiece being supported along a support axis for engagement by the press ram intermediate said workpiece supports for bending correction when mounted in said workpiece mounts in said bearings, said bearings each allowing movement in at least one plane including the support axis when the workpiece is engaged by the press ram and rotationally around the support axis;

at least one of said workpiece supports including a rotation restricting member connected to the one bearing in said one workpiece support to restrict rotational movement of said one bearing and a first workpiece portion supported therein around the support axis while allowing movement of said one bearing and at least the first workpiece portion in the plane of the support axis; and the other of said workpiece supports including a rotation imparting member connected to the other of said bearings and adapted for movement by the press ram, said rotation imparting member imparting rotational movement to said other bearing and a second workpiece portion supported therein around the support axis when moved by the press ram such that the rotational position of the second workpiece portion is changed with respect to the rotational position of the first workpiece portion for twist correction of the workpiece;

at least one of said workpiece supports being movable toward and away from the other of said workpiece supports whereby the distance between said bearings and workpiece mounts may be changed;

said one workpiece support being slidably mounted on said base for sliding movement parallel to the workpiece support axis;

each of said workpiece supports including a bearing mount and a swivel bearing mounted therein concentric with the workpiece support axis;

said rotation restricting member including a projection connected to at least one of said swivel bearings and a receptacle having walls extending parallel to the workpiece support axis, said projection extending into said receptacle such that said receptacle walls limit movement of said projection to a direction parallel to the support axis.

2. The fixture of claim 1 including a measuring device connected to at least said other swivel bearing to measure the rotational position of said other bearing and the second workpiece portion mounted therein.

3. The fixture of claim 2 including a second rotation restricting member connected to said measuring device, said second rotation restricting member including a projection and a corresponding receptacle receiving said projection to limit movement of said projection and said measuring device to a direction parallel to said support axis.

4. The fixture of claim 2 wherein said measuring device is a digital encoder mounted concentric with the workpiece support axis.

5. A fixture for supporting a workpiece on a press for bending and/or twist correction of the workpiece, the press being of the type having a workpiece support area and a movable ram, said fixture comprising:

a base adapted for support on the press workpiece support area;

a pair of workpiece supports, said workpiece supports being mounted at spaced locations on said base, and each including a bearing having a workpiece mount for receiving a workpiece therein, the workpiece being supported along a support axis for engagement by the press ram intermediate said workpiece supports for bending correction when mounted in said workpiece mounts in said bearings, said bearings each allowing movement in at least one plane including the support axis when the workpiece is engaged by the press ram and rotationally around the support axis;

at least one of said workpiece supports including a rotation restricting member connected to the one bearing in one of said workpiece supports to restrict rotational movement of said one bearing and a first workpiece portion supported therein around the support axis while allowing movement of said one bearing and at least the first workpiece portion in the plane of the support axis; and the other of said workpiece supports including a rotation imparting member connected to the other of said bearings and adapted for movement by the press ram, said rotation imparting member imparting rotational movement to said other bearing and second workpiece portion supported therein around the support axis when moved by the press ram such that the rotational position of the second workpiece portion is changed with respect to the rotational position of the first workpiece portion for twist correction of the workpiece;

an arm pivotally mounted on said fixture, said arm engaging said rotation imparting member and adapted to be pivoted by movement of the press ram to change the rotational position of said rotation imparting member.

6. The fixture of claim 5 wherein said rotation imparting member includes a twist plate secured to said other bearing and having a projection extending outwardly therefrom into engagement with said arm wherein pivotal movement of said moves said twist plate to impart rotational movement to said other bearing, said workpiece mount therein, and the second workpiece portion.

7. The fixture of claim 6 including a pivot for pivotally mounting said arm, said twist plate projection engaging said arm at a position spaced from said pivot.

8. The fixture of claim 7 wherein said arm includes an opening, said twist plate projection including a roller received in said opening and engaging the section of said arm defining said opening.

9. The fixture of claim 8 wherein said opening is elongated in a radial direction with respect to said pivot; said twist plate projection extending rad ally with respect to the support axis of the workpiece; said pivot having an axis extending generally perpendicular to the support axis.

10. The fixture of claim 9 wherein said arm includes a press ram engaging area intermediate said pivot and said opening.

11. The fixture of claim 10 wherein said press ram engaging area is an opening in said arm.

12. A fixture for supporting a workpiece on a press for bending and/or twist correction of the workpiece, the press being of the type having a workpiece support area and a movable ram, said fixture comprising:

a base adapted for support on the press workpiece support area;

a pair of workpiece supports, said workpiece supports being mounted at spaced locations on said base, and each including a bearing having a workpiece mount for receiving a workpiece therein, the workpiece being supported along a support axis for engagement by the press ram intermediate said workpiece supports for bending correction when mounted in said workpiece mounts in said bearings, said bearings each allowing movement in at least one plane including the support axis when the workpiece is engaged by the press ram and rotationally around the support axis;

at least one of said workpiece supports including a rotation restricting member connected to the one bearing in one of said workpiece supports to restrict rotational movement of said one bearing and a first workpiece portion supported therein around the support axis while allowing movement of said one bearing and at least the first workpiece portion in the plane of the support axis; and the other of said workpiece supports including a rotation imparting member connected to the other of said bearings and adapted for movement by the press ram, said rotation imparting member imparting rotational movement to said other bearing and a second workpiece portion supported therein around the support axis when moved by the press ram such that the rotational position of the second workpiece portion is changed with respect to the rotational position of the first workpiece portion for twist correction of the workpiece;

the press ram being reciprocable; said fixture including an arm mounted thereon and engaging said rotation imparting member, said arm coverting reciprocating movement of the press ram to rotational movement of said rotation imparting member, said other bearing and said workpiece mount therein.

13. A fixture for supporting a workpiece on a press for bending and/or twist correction of the workpiece, the press being of the type having a workpiece support area and a movable ram, said fixture comprising:

a base adapted for support on the press workpiece support area;

a pair of workpiece supports, said workpiece supports being mounted at spaced locations on said base, and each including a bearing having a workpiece mount for receiving a workpiece therein, the workpiece being supported along a support axis for engagement by the press ram intermediate said workpiece supports for bending correction when mounted in said workpiece mounts in said bearings, said bearings each allowing movement in at least one plane including the support axis when the workpiece is engaged by the press ram and rotationally around the support axis;

at least one of said workpiece supports including a rotation restricting member connected to the one bearing in one of said workpiece supports to restrict rotational movement of said one bearing and a first workpiece portion supported therein around the support axis while allowing movement of said one bearing and at least the first workpiece portion in the plane of the support axis; and the other of said workpiece supports including a rotation imparting member connected to the other of said bearings and adapted for movement by the press ram, said rotation imparting member imparting rotational movement to said other bearing and a second workpiece portion supported therein around the support axis when moved by the press ram such that the rotational position of the second workpiece portion is charged with respect to the rotational position of the first workpiece portion for twist correction of the workpiece;

said rotation restricting member including a projection connected to at least one of said bearings and a receptacle having walls extending parallel to the workpiece support axis, said projection extending into said receptacle such that said receptacle walls limit movement of said projection to a direction parallel to the support axis.

14. A fixture for supporting a workpiece on a press for twist correction of the workpiece, the press having a workpiece support area and a movable ram, said fixture comprising:

a base adapted for support on the press workpiece support area;

a pair of workpiece supports, said workpiece supports being mounted at spaced locations on said base and each including a bearing having a workpiece mounted for receiving a workpiece therein, the workpiece being supported alone a support axis when mounted in said workpiece mounts in said bearings of said spaced workpiece supports, said bearings each allowing at least rotational movement around the support axis;

at least one of said workpiece supports including a rotation restricting member connected to the one bearing in one of said workpiece supports to restrict rotational movement of said one bearing and a first workpiece portion supported therein around the support axis;

the other of said workpiece supports including a rotation imparting member connected to the other of said bearings and adapted for movement by the press ram, said rotation imparting member imparting rotational movement to said other bearing and second workpiece portion supported therein rotationally around the support axis when moved by the press ram such that the rotational position of the second workpiece portion is changed with respect to the rotational position of the first workpiece portion for twist correction of the workpiece;

an arm pivotally mounted on said fixture, said arm engaging said rotation imparting member and adapted to be pivoted by movement of the press ram to change the rotational position of said rotation imparting member.

15. The fixture of claim 14 wherein said rotation imparting member includes a twist plate secured to said other bearing and having a projection extending outwardly therefrom into engagement with said arm wherein pivotal movement of said arm moves said twist plate to impart rotational movement to said other bearing, said workpiece mount therein, and the second workpiece portion.

16. The fixture of claim 15 including a pivot for pivotally mounting said arm, said twist plate projection engaging said arm at a position spaced from said pivot.

17. The fixture of claim 16 wherein said arm includes an opening, said twist plate projection including a roller received in said opening and engaging the section of said arm defining said opening.

18. The fixture of claim 17 wherein said opening is elongated in a radial direction with respect to said pivot; said twist plate projection extending radially with respect to the support axis of the workpiece; said pivot having an axis extending generally perpendicular to the support axis.

19. The fixture of claim 18 wherein said arm includes a press ram engaging area intermediate said pivot and said opening.

20. The fixture of claim 19 wherein said press ram engaging area is an opening in said arm.

21. A fixture for supporting a workpiece on a press for twist correction of the workpiece, the press having a workpiece support area and a movable ram, said fixture comprising:
- a base adapted for support on the press workpiece support area;
- a pair of workpiece supports, said workpiece supports being mounted at spaced locations on said base and each including a bearing having a workpiece mount for receiving a workpiece therein, the workpiece begin supported along a support axis when mounted in said workpiece mounts in said bearings of said spaced workpiece supports, said bearings each allowing at least rotational movement around the support axis;
- at least one of said workpiece supports including a rotation restricting member connected to the one bearing in one of said workpiece supports to restrict rotational movement of said one bearing and a first workpiece portion supported therein around the support axis;
- the other of said workpiece supports including a rotation imparting member connected to the other of said bearings and adapted for movement by the press ram, said rotation imparting member imparting rotational movement to said other bearing and a second workpiece portion supported therein rotationally around the support axis when moved by the press ram such that the rotational position of the second workpiece portion is changed with respect to the rotational position of the first workpiece portion for twist connection of the workpiece;
- the press ram being reciprocable; said fixture including an arm mounted thereon and engaging said rotation imparting member, said arm coverting reciprocating movement of the press ram to rotational movement of said rotation imparting member, said other bearing and said workpiece mount therein.

22. A fixture for supporting a workpiece on a press for twist correction of the workpiece, the press having workpiece support area and a movable ram, said fixture comprising:
- a base adapted for support on the press workpiece support area;
- a pair of workpiece supports, said workpiece supports being mounted at spaced locations on said base and each including a bearing having a workpiece mount for receiving a workpiece therein, the workpiece being supported along a support axis wherein mounted in said workpiece mounts in said bearings of said spaced workpiece supports, said bearings each allowing at least rotational movement around the support axis;
- at least one of said workpiece supports including a rotation restricting member connected to the one bearing in one of said workpiece supports to restrict rotational movement of said one bearing and a first workpiece portion supported therein around the support axis;
- the other of said workpiece supports including a rotation imparting member connected to the other of said bearings and adapted for movement by the press ram, said rotation imparting member imparting rotational movement to said other bearing and a second workpiece portion supported therein rotationally around the support axis when moved by the press ram such that the rotational position of the second workpiece portion is changed with respect to the rotational position of the first workpiece portion for twist correction of the workpiece;
- said rotation restricting member including a projection connected to at least one of said bearings and a receptacle having walls extending parallel to the workpiece support axis, said projection extending into said receptacle such that said receptacle walls limit movement of said projection to a direction parallel to the support axis.

23. A fixture for supporting a workpiece on a press for bending correction of the workpiece, the press being of the type having a workpiece support area and a movable ram, said fixture comprising:
- a base adapted for support on the press workpiece support area;
- a pair of workpiece supports, said workpiece supports being mounted at spaced locations on said base and each including a bearing having a mount for receiving a workpiece therein, the workpiece being supported along a support axis for engagement by the press ram intermediate said workpiece supports for bending correction when mounted in said workpiece mounts in said bearings, said bearings each allowing movement in at least one plane including the support axis when the workpiece is engaged by the press ram;
- said bearings each also allowing rotation around the support axis;
- at least one of said workpiece supports including a rotation restricting member connected to the one bearing in one of said workpiece supports to restrict rotational movement of said one bearing and a first workpiece portion supported therein around the support axis while allowing movement of said one bearing and at least the first workpiece portion in the plane of the support axis when the workpiece is engaged by the press ram;
- the other of said workpiece supports including a rotation imparting member connected to the other of said bearings and adapted for movement by the press ram said rotation imparting member imparting rotational movement to said other bearing and a second workpiece portion supported therein rotationally around the support axis when moved by the press ram such that the rotational position of the second workpiece portion is changed with respect to the rotational position of the first workpiece portion; and
- an arm pivotally mounted on said fixture, said arm engaging said rotation imparting member and adapted to be pivoted by movement of the press ram to change the rotational position of said rotation imparting member.

24. The fixture of claim 23 wherein said rotation imparting member includes a twist plate secured to said other bearing and having a projection extending outwardly therefrom into engagement with said arm wherein pivotal movement of said arm moves said twist plate to impart rotational movement to said other bearing, said workpiece mount therein, and the second workpiece portion.

25. The fixture of claim 24 including a pivot for pivotally mounting said arm, said twist plate projection engaging said arm at a position spaced from said pivot.

26. The fixture of claim 25 wherein said arm includes an opening, said twist plate projection including a roller received in said opening and engaging the section of said arm defining said opening.

27. The fixture of claim 26 wherein said opening is elongated in a radial direction with respect to said pivot; said twist plate projection extending radially with respect to the support axis of the workpiece; said pivot having an axis extending generally perpendicular to the support axis.

28. The fixture of claim 27 wherein said arm includes a press ram engaging area intermediate said pivot and said opening.

29. A fixture for supporting a workpiece on a press for bending correction of the workpiece, the press being of the type having a workpiece support area and a movable ram, said fixture comprising:

a base adapted for support on the press workpiece support area;

a pair of workpiece supports, said workpiece supports being mounted at spaced locations on said base and each including a bearing having a mount for receiving a workpiece therein, the workpiece being supported along a support axis for engagement by the press ram intermediate said workpiece supports for bending correction when mounted in said workpiece mounts in said bearings, said bearings each allowing movement in at least one plane including the support axis when the workpiece is engaged by the press ram;

said bearings each also allowing rotation around the support axis;

at least one of said workpiece supports including a rotation restricting member connected to the one bearing in one of said workpiece supports to restrict rotational movement of said one bearing and a first workpiece portion supported therein around the support axis while allowing movement of said one bearing and at least the first workpiece portion in the plane of the support axis when the workpiece is engaged by the press ram;

the other of said workpiece supports including a rotation imparting member connected to the other of said bearings and adapted for movement by the press ram, said rotation imparting member imparting rotational movement to said other bearing and a second workpiece portion supported therein rotationally around the support axis when moved by the press ram such that the rotational position of the second workpiece portion is changed with respect to the rotational position of the first workpiece portion;

the press ram being reciprocable; said fixture including an arm mounted thereon and engaging said rotation imparting member, said arm coverting reciprocating movement of the press ram to rotational movement of said rotation imparting member, said other bearing and said workpiece mount therein.

30. A fixture supporting a workpiece on a press for bending correction of the workpiece, the press being of the type having a workpiece support area and a movable ram, said fixture comprising:

a base adapted for support on the press workpiece support area;

a pair of workpiece supports, said workpiece supports being mounted at spaced locations on said base and each including a bearing having a mount for receiving a workpiece therein, the workpiece being supported along a support axis for engagement by the press ram intermediate said workpiece supports for bending correction when mounted in said workpiece mounts in said bearings, said bearings each allowing movement in at least one plane including the support axis when the workpiece is engaged by the press ram;

said bearings each also allowing rotation around the support axis;

at least one of said workpiece supports including a rotation restricting member connected to the one bearing in one of said workpiece supports to restrict rotational movement of said one bearing and a first workpiece portion supported therein around the support axis while allowing movement of said one bearing and at least the first workpiece portion in the plane of the support axis when the workpiece is engaged by the press ram;

said rotation restricting member including a projection connected to at least one of said bearings and a receptacle having walls extending parallel the workpiece support axis, said projection extending into said receptacle such that said receptacle walls limit movement of said projection to a direction parallel to the support axis.

* * * * *

UNITED STATES PATENT AND TRADEMARK OFFICE
CERTIFICATE OF CORRECTION

PATENT NO. : 6,959,572 B2 Page 1 of 1
APPLICATION NO. : 10/324901
DATED : November 1, 2005
INVENTOR(S) : Phillip G. Lawrence, Frederick W. Hohman and Jeffrey R. Braak It is certified that error appears in the above-identified patent and that said Letters Patent is hereby corrected as shown below:

Item (54) Title:
Line 1, "METALS" should be --METAL--.

Column 16:
Line 37, Claim 5, Insert --a-- before "second".
Line 51, Claim 6, Insert --arm-- before "moves".
Line 63, Claim 9, "rad ally" should be --radially--.

Column 18:
Line 10, Claim 13, "charged" should be --changed--.
Line 28, Claim 14, "mounted" should be--mount--.
Line 30, Claim 14, "alone" should be --along--.
Line 43, Claim 14, Insert --a-- before "second".

Column 19:
Line 20, Claim 21, "begin" should be --being--.
Line 39, Claim 21, "connection" should be --correction--.
Line 48, Claim 22, Insert --a-- after "having".
Line 57, Claim 19, "wherein" should be --when--.

Column 22:
Line 10, Claim 30, Insert --for-- before "supporting".
Line 39, Claim 30, Insert --to-- after "parallel".

Signed and Sealed this

Second Day of January, 2007

JON W. DUDAS
*Director of the United States Patent and Trademark Office*